United States Patent
Gabriel et al.

(10) Patent No.: US 8,544,416 B2
(45) Date of Patent: Oct. 1, 2013

(54) VENTILATED RACK SYSTEM

(75) Inventors: George S. Gabriel, Seaford, DE (US);
Neil E. Campbell, Eden, MD (US);
Chin Soo Park, Salisbury, MD (US);
Dale Murray, Elkton, MD (US); Lynn Irwin, Seaford, DE (US); Rodney Gerringer, Forest Hill, MD (US);
Edward K. Eldreth, Port Deposit, MD (US); Philip A. Lastowski, Millersville, PA (US); Curtis Miller, Seaford, DE (US)

(73) Assignee: Lab Products, Inc., Seaford, DE (US)

( * ) Notice: Subject to any disclaimer, the term of this patent is extended or adjusted under 35 U.S.C. 154(b) by 831 days.

(21) Appl. No.: 11/871,942

(22) Filed: Oct. 12, 2007

(65) Prior Publication Data
US 2009/0095697 A1    Apr. 16, 2009

(51) Int. Cl.
*A01K 1/02*    (2006.01)
(52) U.S. Cl.
USPC .......................................... 119/455; 119/474
(58) Field of Classification Search
USPC ................. 119/416, 419, 430, 474, 455, 456, 119/457, 458; 220/4.32
See application file for complete search history.

(56) References Cited

U.S. PATENT DOCUMENTS

| | | | |
|---|---|---|---|
| 4,085,705 A | 4/1978 | Gland et al. | |
| 4,460,228 A | 7/1984 | Lane et al. | |
| 4,480,587 A | 11/1984 | Sedlacek | |
| 5,012,943 A * | 5/1991 | King | 220/4.32 |
| 5,044,316 A * | 9/1991 | Thomas | 119/419 |
| 5,349,923 A | 9/1994 | Sheaffer et al. | |

(Continued)

FOREIGN PATENT DOCUMENTS

| EP | 0 744 122 | 11/1996 |
|---|---|---|
| WO | 2004/036983 | 5/2004 |

OTHER PUBLICATIONS

Partial Search Report for International Application No. PCT/US2007/081311 dated Jul. 17, 2008.

(Continued)

*Primary Examiner* — Darnell Jayne
*Assistant Examiner* — Daniel Rohrhoff
(74) *Attorney, Agent, or Firm* — Stroock & Stroock & Lavan LLP

(57) ABSTRACT

A ventilated cage and rack system for assembly by a user using simple tools and a method for assembly is provided. A plurality of frames and vertical plenums can be connected to a base, and a retaining assembly can be used to connect a plurality of vertical beams and horizontal support beams. A plurality of canopies is preferably used to connect the plenums and the support beams to shroud cages beneath the canopies. The canopies preferably include removable side walls to adapt to the width of the cage being shrouded. A plenum clean out system preferably provides a relatively simple method of draining a cleaning fluid from a plenum by moving a lever between an open and closed position. A pressure based plenum system is also provided wherein a constant air pressure is maintained in the ventilated rack system and air is provided into a cage at a constant air pressure.

10 Claims, 40 Drawing Sheets

(56) References Cited

U.S. PATENT DOCUMENTS

| | | |
|---|---|---|
| 5,954,013 A | 9/1999 | Gabriel et al. |
| 6,041,741 A | 3/2000 | Gabriel et al. |
| 6,158,387 A * | 12/2000 | Gabriel et al. ............... 119/419 |
| 6,543,282 B1 | 4/2003 | Thompson |
| 7,588,162 B2 * | 9/2009 | Dube et al. .................... 220/552 |
| 2003/0097875 A1 | 5/2003 | Lentz |
| 2005/0205017 A1* | 9/2005 | Irwin et al. ................... 119/455 |
| 2007/0193527 A1 | 8/2007 | Verhage |

OTHER PUBLICATIONS

"Robust, Low-cost, and Highly Sensitive Means to Detect Prescence of Air Flow and Direction", IBM Technical Disclosure Bulletin, IBM Corp., New York, US vol. 39, No. 1, Jan. 1, 1996, p. 5.

International Search Report and Written Opinion of the International Searching Authority (US) for International Application No. PCT/US2007/081311.

Extended Search Report issued on Jul. 10, 2012 in the corresponding European Patent Appln. No. 12000434.6.

* cited by examiner

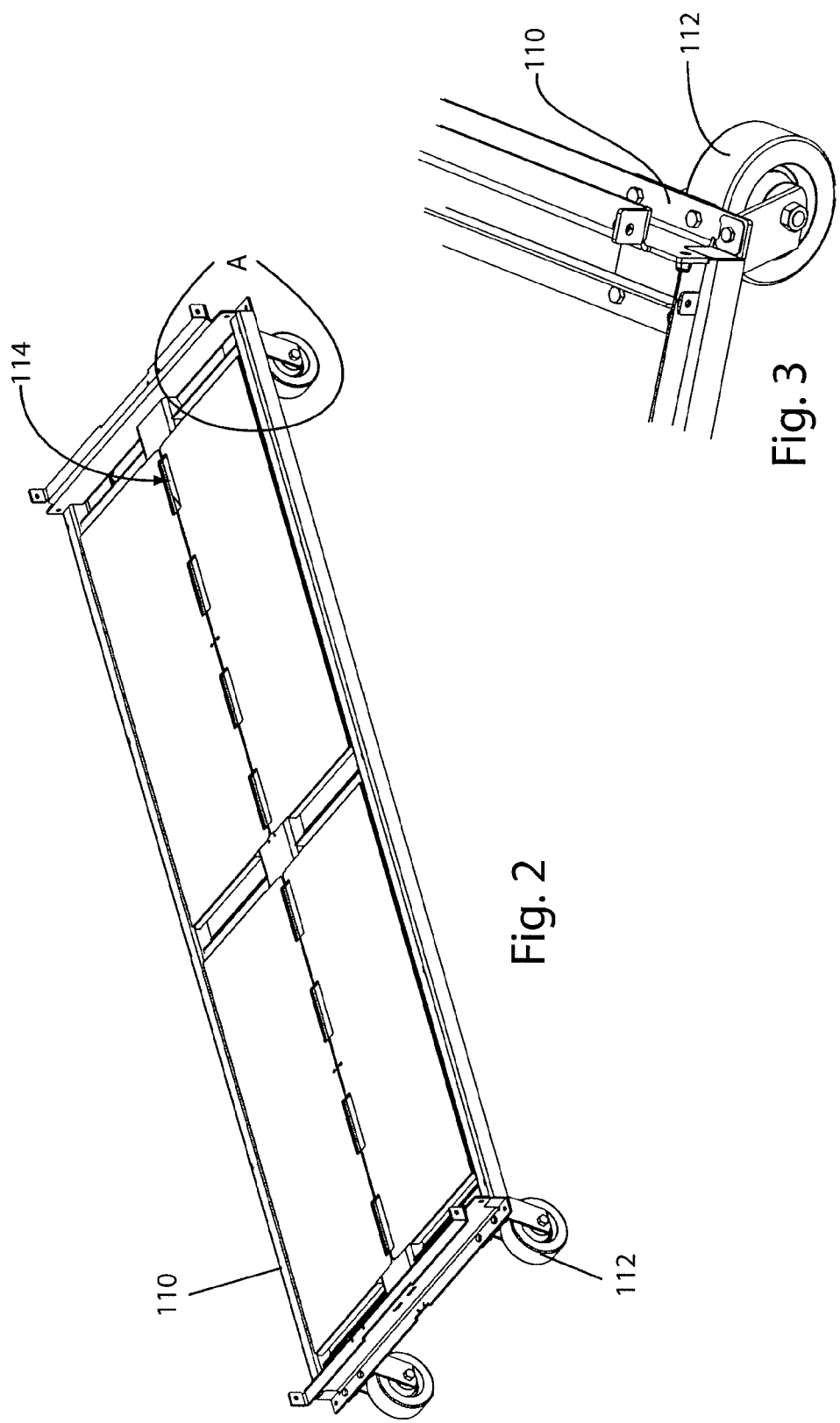

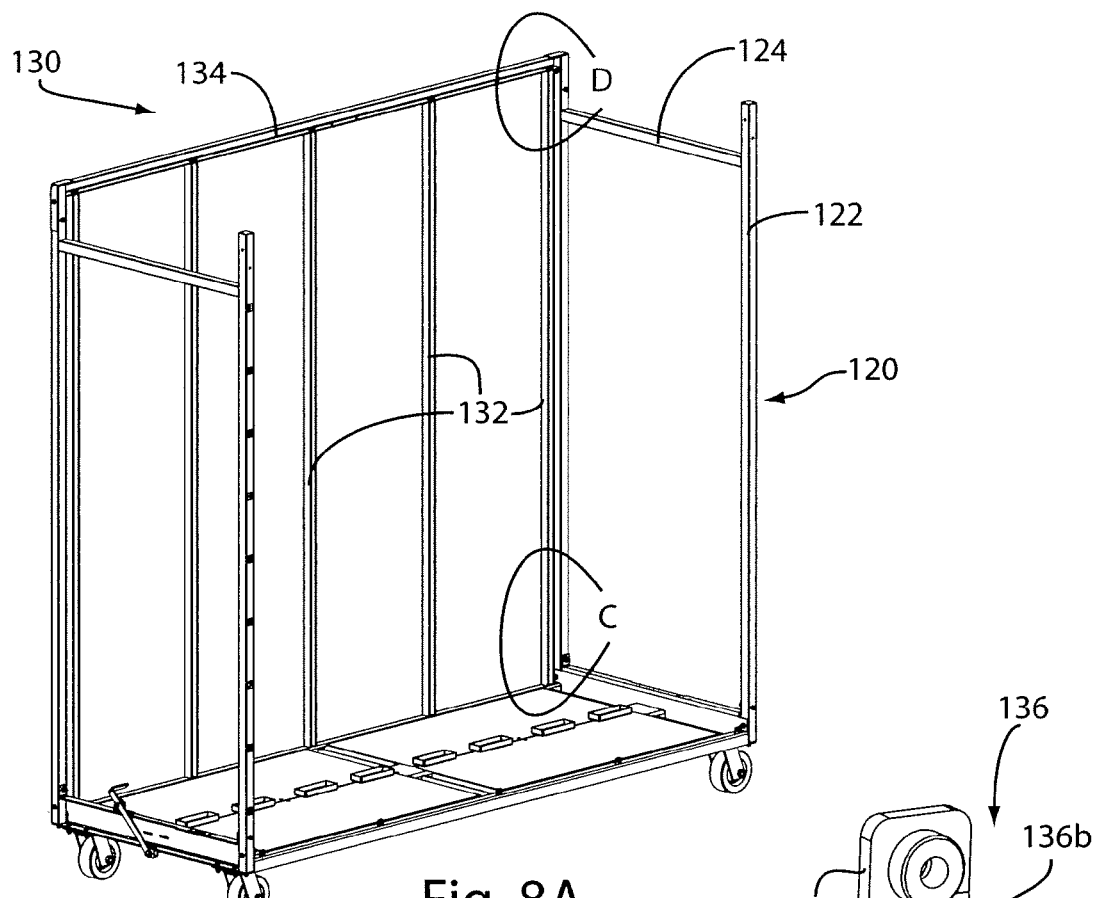
Fig. 8A
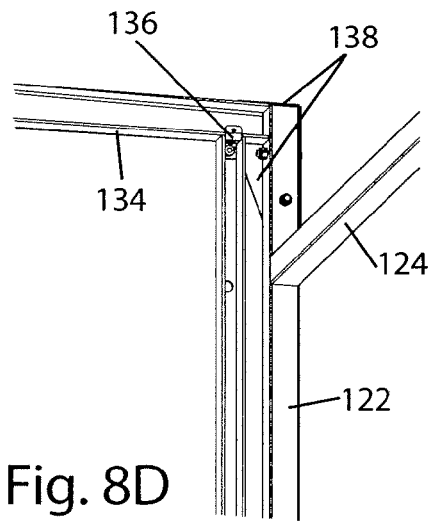
Fig. 8B
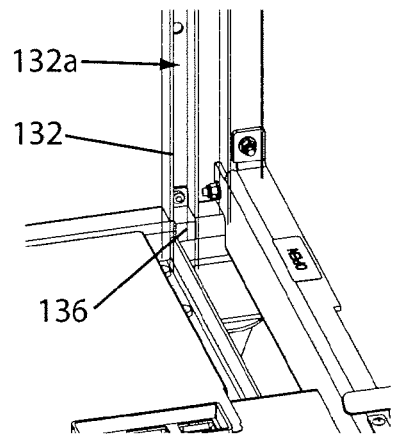
Fig. 8C
Fig. 8D

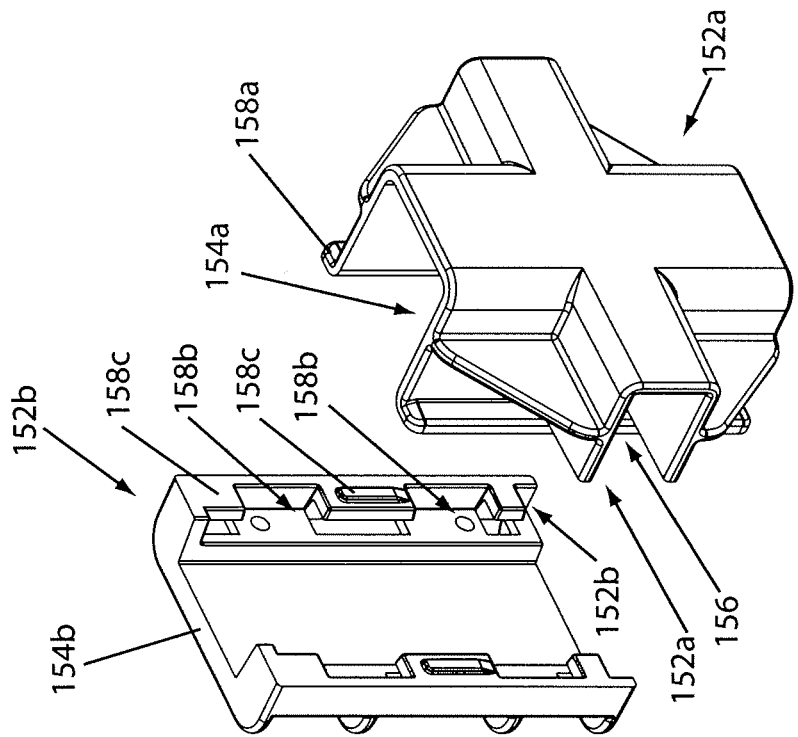
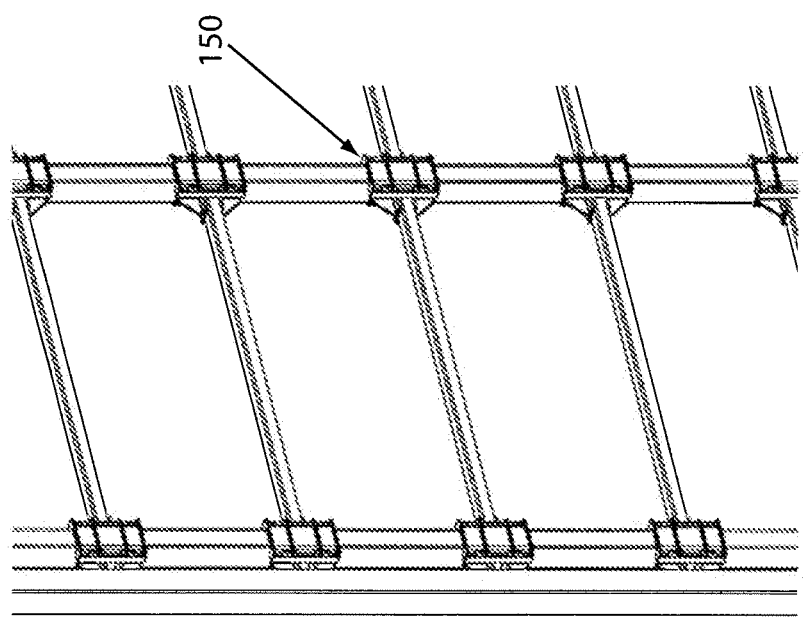

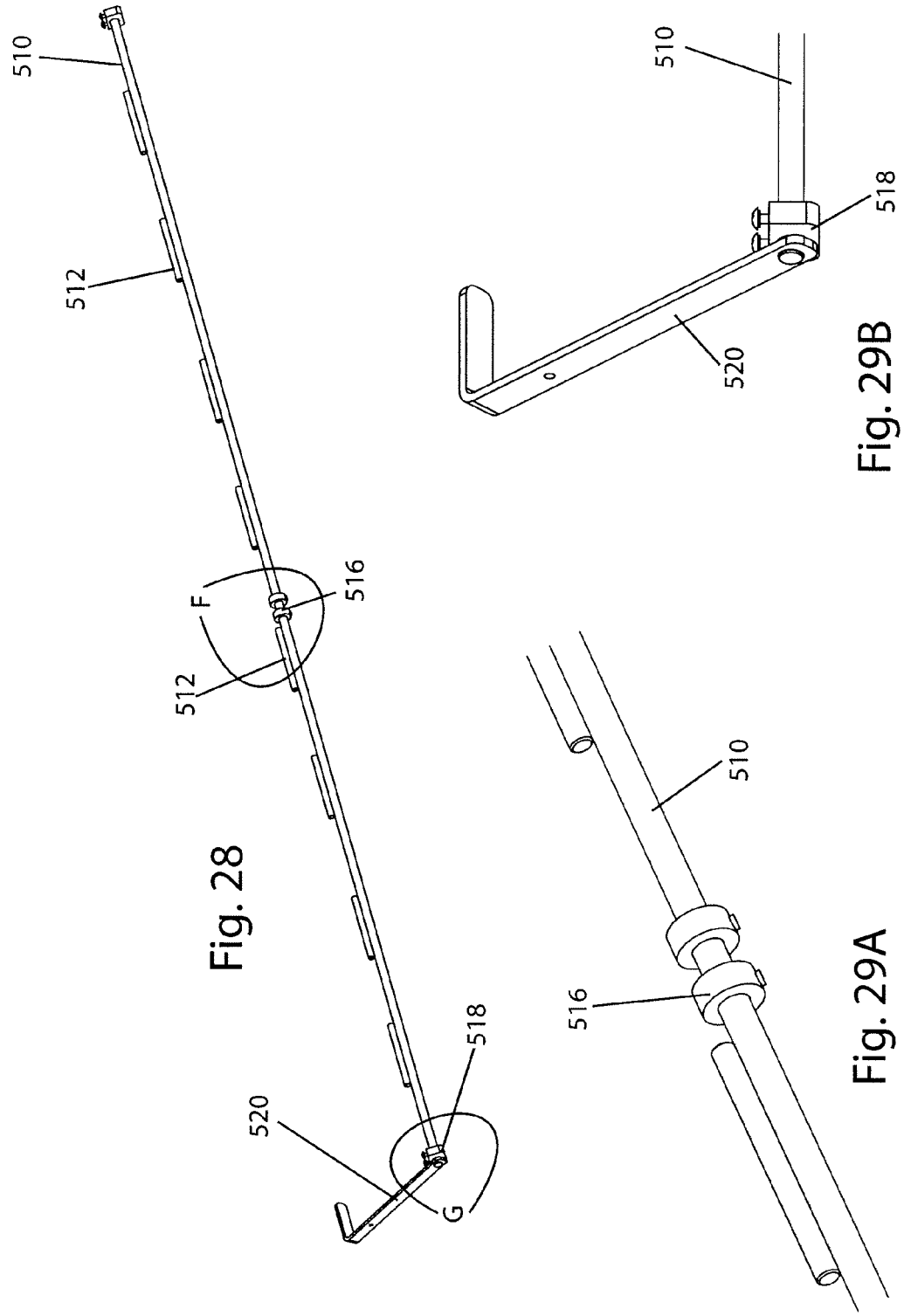

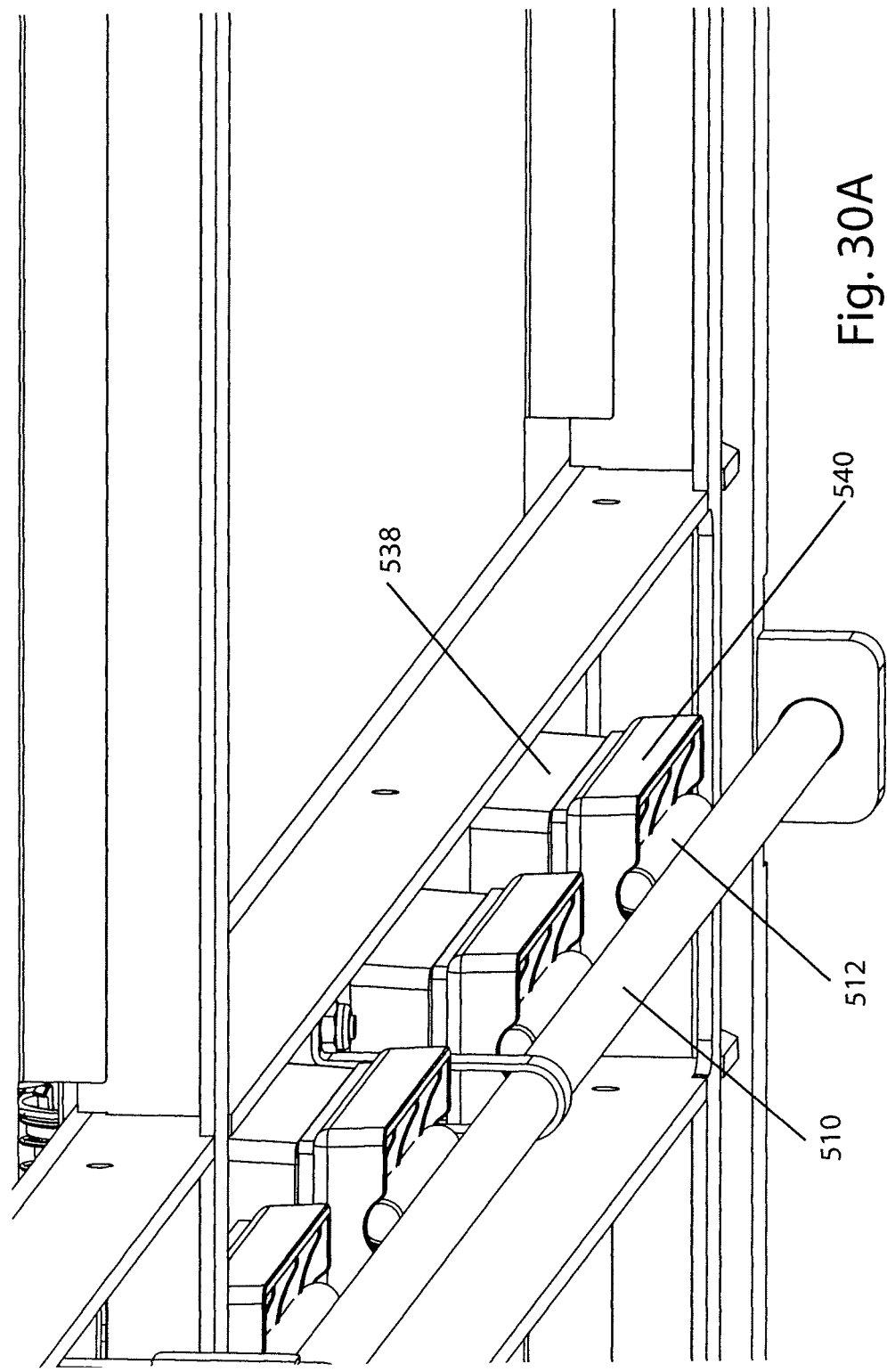

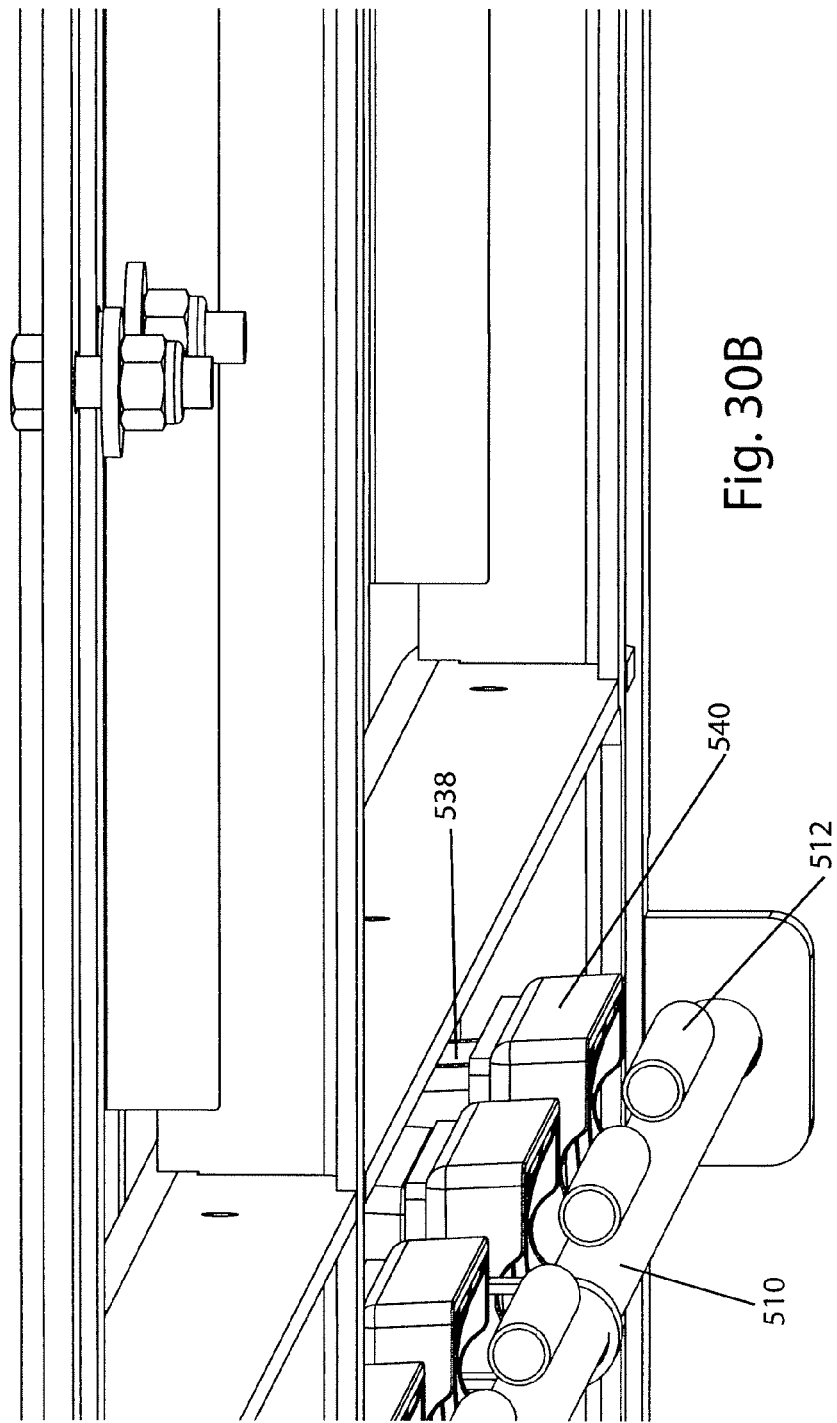

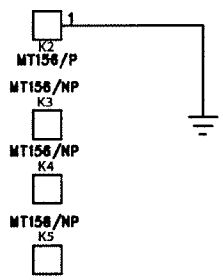
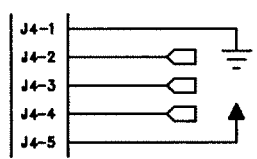
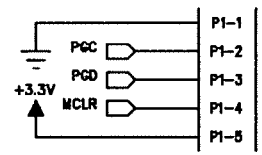
Fig. 38F   Fig. 38G   Fig. 38H
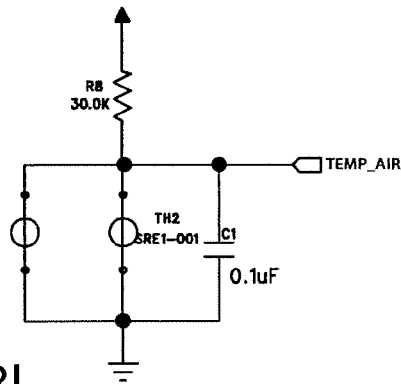
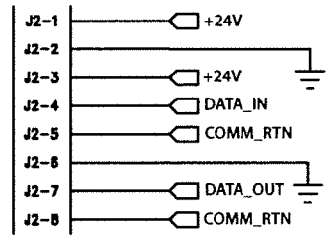
Fig. 38I   Fig. 38J
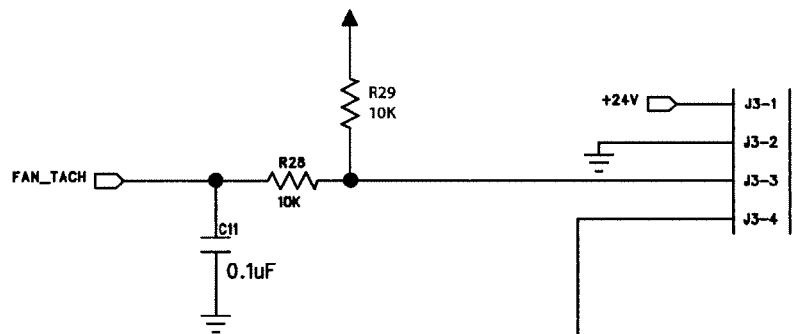
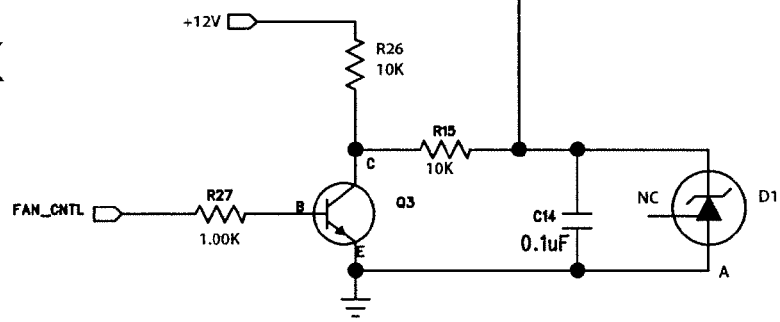
Fig. 38K

US 8,544,416 B2

VENTILATED RACK SYSTEM

BACKGROUND OF THE INVENTION

The present invention relates to a ventilated laboratory rack system. More specifically, the invention relates to a ventilated rack system, which can be provided to a user that is not assembled for the user to assemble when needed. The ventilated rack system preferably also provides a cleaning system, canopies that can be adjusted to receive cages of varying widths, and a ventilation system that controls air pressure in the plenum for even distribution of air in the rack.

Ventilated rack systems commonly available in the art are typically assembled by the manufacturer and shipped to the laboratory in an assembled format. Such a system often requires relatively high shipping costs. Additionally, because the systems require sufficient storage space, a laboratory will usually wait until a foreseeable need arises before placing an order. Additionally, the systems are often difficult to clean and manipulate.

Accordingly, it is desirable to provide a ventilated rack system wherein these drawbacks are overcome.

SUMMARY OF THE INVENTION

A ventilated rack system preferably includes components that can be assembled by a user, for example, in a laboratory, using relatively simple tools. Preferably, a base, a plurality of frames, beams, plenums, fans, and canopies can be assembled to form the ventilated rack system.

An embodiment comprising an air handling unit provides a constant airflow pressure to the cages in the rack. The system preferably adjusts the air pressure according to the rack population to provide uniform airflow pressure. The system can include a control system having a leadless thermistor having air gaps to further control the air being provided to the rack and the cages.

An embodiment of a canopy system is also provided wherein the canopies can be adjusted according to the width of the cage being received thereunder. More specifically, the canopy can include one or more removable sides, wherein adjacent canopies can be combined to shroud a wider cage beneath the canopies by removing the canopy sides between the adjacent canopies. For example, two adjacent canopies can receive a cage having double the width of a cage received under a single canopy having two sides attached thereto.

An embodiment of a clean-out system includes a lever easily accessible from outside the rack, for example, from the side of the rack. Displacing the lever to an open position preferably opens the gaskets to drain or permit the flow of cleaning fluids through the air plenums which supply air to and remove air from the rack. Displacing the lever back to the closed position preferably closes the gaskets and seals the air plenums.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE DRAWINGS

The particular features and advantages of the invention as well as other objects will become apparent from the following description taken in connection with the accompanying drawings, in which:

FIG. 2 is a perspective view of a base of a rack system in accordance with an embodiment of the invention;

FIG. 3 is an enlarged perspective view of area A of FIG. 2;

FIG. 8A is a perspective view of a partially assembled rack system in accordance with an embodiment of the invention;

FIG. 8B is a perspective view of a connector in accordance with an embodiment of the invention;

FIG. 8C is an enlarged perspective view of area C of FIG. 8A;

FIG. 8D is an enlarged perspective view of area D of FIG. 8A;

FIG. 10 is an enlarged partial view of the partially assembled rack system of FIG. 9;

FIG. 11 is an exploded perspective view of a retainer assembly in accordance with an embodiment of the invention;

FIG. 28 is a partial perspective view of a clean-out rod and lever in accordance with an embodiment of the invention;

FIG. 29A is an enlarged view of area F of FIG. 28;

FIG. 29B is an enlarged view of area G of FIG. 28;

FIG. 30A is a perspective view of a clean-out rod and gasket in a first position in accordance with an embodiment of the invention;

FIG. 30B is a perspective view of a clean-out rod and gasket in a second position in accordance with an embodiment of the invention;

FIGS. 38A-K are schematic diagrams of a portion of a control system in accordance with an embodiment of the invention.

DESCRIPTION OF EXEMPLARY EMBODIMENTS

Certain exemplary embodiments of the present invention will now be described with reference to the drawings. In general, such embodiments as shown in FIGS. 1-36 relate to a ventilated rack system, generally indicated at 10, having components that can be assembled by an end user, for example, at a laboratory rather than being pre-assembled by the manufacturer at the factory. Accordingly, the ventilated rack system 10 preferably includes a pressure based air handling unit 300, a relatively easily operated clean-out system 500, and adjustable canopies 700 having selectively removable sides.

Figure 1:
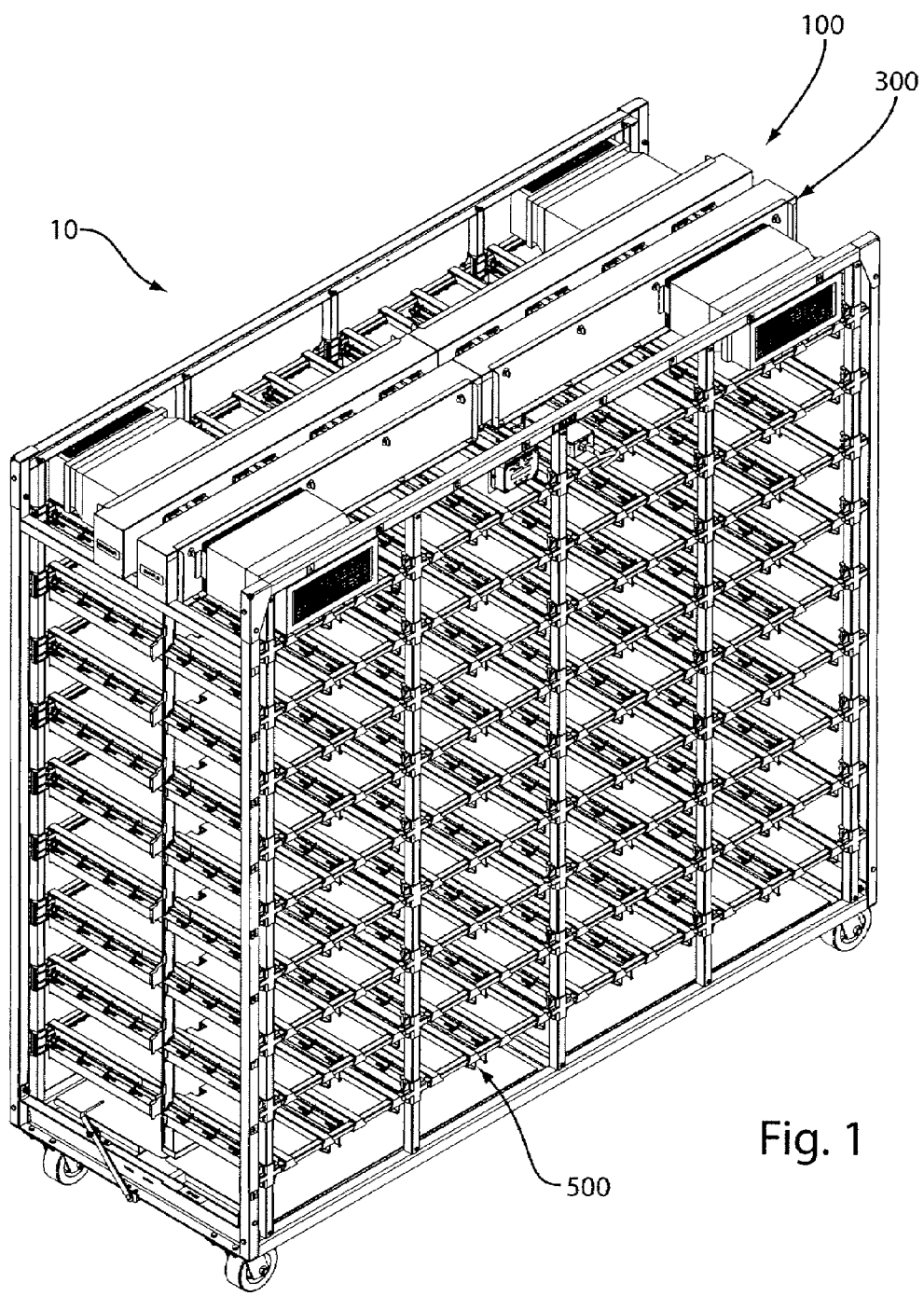
FIG. 1 is a perspective view of a rack system in accordance with an embodiment of the invention.

An air handling unit generally indicated at 300 provides air from an air supply blower 370 through one or more vertical plenums 310 to a plurality of shelves on a rack 100 and into cages 20, 22 positioned on the shelves. Referring to FIG. 1, the shelves can be defined by a plurality of canopies 700 constructed and arranged to shroud cages 20, 22. Cage 20, 22 can be supported by the canopy 700 beneath cage 20, 22. Alternatively, cages 20, 22 can be suspended beneath canopy 700, being supported by canopy 700 above cage 20, 22. Therefore, cage 20, 22 is preferably positive to rack 100. The vertical plenums 310 preferably also draw air in from the room, thus creating a negative rack. Therefore, air from the cages 20, 22 preferably does not escape into the room in which the rack is located. Rather, air from the room can be drawn into rack 100 and further into vertical plenum 310. However, because the cage is in positive pressure with respect to the rack, such air from the room preferably does not enter cage 20, 22. The air drawn into vertical plenum 310 is preferably filtered and released into the room.

An embodiment of the ventilated rack system 10 preferably also includes a clean out system 500 comprising a separable gasket assembly. For example, the gasket assembly can be connected to vertical plenum 310, such that if water or other cleaning fluid is introduced into vertical plenum 310, the water or cleaning fluid can be drained by selectively opening the gasket assembly. Preferably, the gasket assembly can remain open during autoclaving and/or drying of the ventilated cage and rack system, which can facilitate sterilizing and/or drying the inside of vertical plenum 310. The gasket assembly can preferably be opened and closed relatively simply, for example, via moving a lever 520 between an opened and closed positions. Such a clean out system 500 will be described in detail below.

An exemplary embodiment of the ventilated rack system 10 includes a canopy 700 that is adjustable according to the width of the cage being housed thereunder. For example, canopy 700 can include removable canopy sides 720 that can be attached or detached as desired. Accordingly, whereas a single canopy 700 can shroud a narrow cage 20, the inner canopy sides 720 of two adjacent canopies 700 can be removed to collectively shroud a wide cage 22 beneath the two adjacent canopies 700. Preferably, the canopy sides 722 can be removed as necessary according to the cage width being received and is not limited to two canopies 700. Certain embodiments of canopy 700 will be described in detail below.

Reference is made to FIG. 1, wherein a ventilated rack system 10 constructed in accordance with an embodiment of the invention is illustrated. Ventilated rack system 10 preferably includes an open rack 100 having side frames 120, a rear frame 130 having a rear top beam 134 and a plurality of rear vertical beams 132, a front frame 230 having a front top beam 234 and a plurality of front vertical beams 232, and a base 110. A plurality of support beams 140, 240 can be disposed in parallel between top beams 134, 234 and base 110.

Ventilated rack system 10 can also include a plurality of vertical plenum 310 arranged in parallel between side frames 120 for supplying and removing air to and from rack 100. An air supply blower 370 can provide HEPA filtered air through supply plenum 350, preferably extending horizontally proximate the top of rack 100, to an air supply channel 320 of vertical plenum 310 via an air supply port 322. The air can be provided through an air supply docking assembly 340 to cage 20, 22 in rack 100.

Cage 20, 22 preferably includes a filter top, through which air from cage 20, 22 can be filtered as it exits or enters cage 20, 22. The filter top may have an overhang which extends over the top end of the cage bottom. The cage bottom is preferably gas impermeable and includes an upstanding side wall. Examples of suitable filter tops and cages are described in U.S. Pat. Nos. 5,954,013; 4,480,587; 4,460,228; 5,954,013; 6,041,741 assigned to Lab Products, Inc.

A canopy 700 can extend between a vertical plenum 310 and a support beam 140, 240. Each canopy 700 can shroud a narrow cage 20 thereunder, or two canopies 700 can collective shroud a wide cage 22 thereunder. Canopy 700 is preferably shaped and positioned to substantially surround the filter top of cage 20, 22, while maintaining a gap between canopy 700 and cage 20, 22 to permit the flow of air between canopy 700 and cage 20, 20. It is to be understood that canopy 700 preferably can support a cage 20, 22 above canopy 700 or suspend cage 20, 22 thereunder as a matter of application specific design choice without deviating from the scope of the invention.

Air from within cage 20, 22 can exit through the filter top into the gap, from which the air can be withdrawn through a canopy top aperture 714 through one or more, preferably two, first exhaust apertures 336 into an exhaust channel 330 of vertical plenum 310. Air surrounding cage 20, 22, for example, air that escapes between the filter top and the cage bottom, can be withdrawn through a second exhaust aperture 338, preferably located on either side of cage 20, 22 into exhaust channel 330. The air can exit exhaust channel 330 via an exhaust port 332 into an exhaust plenum 360, preferably extending horizontally along the top of rack 100. The air is then HEPA filtered in an exhaust blower 380 and the HEPA filtered air is expelled into a facility exhaust return or the room or other area in which ventilated rack system 10 is located.

Plenum System

In accordance with an exemplary embodiment of the invention, the air handling unit 300 includes a pressure based system and provides relatively consistent airflow into the cage 20, 200 independent of the cage population of the rack 100. A thermistor 391 may have air gaps 392 surrounding it, wherein air gaps 392 facilitate thermal isolation of a printed circuit board 394 of thermistor 390, printed circuit board 394 is being connected to a bead 396. Air handling unit 300 preferably includes a first heater system and a second heater system 398, wherein the second heater system 398 maintains the printed circuit board 394 at a constant temperature below bead and above ambient. An exemplary embodiment of air handling unit 300 can actively measure the temperature surrounding printed circuit board 394, and can account for such temperature in controlling the temperature of ventilated rack system 10, as will be described in detail below.

Rather than maintaining a constant volumetric airflow within the plenum, as commonly used, an embodiment of the invention controls the air pressure in the plenum system instead. One drawback of some volumetric airflow plenum systems includes difficulty in maintaining a constant volumetric flow independent of the number of cages in the rack. For example, whereas a constant airflow through the supply nozzle whether or not a cage is present, a cage often introduces its own airflow impedance, rendering such constant airflow difficult. Therefore, the airflow into the cages in the rack often varies according to the rack occupancy. For example, less air may be provided through supply nozzles connected to a cage and move air through supply nozzles at which a cage is not present In a pressure based plenum system 300 in accordance with an exemplary embodiment of the invention, in contrast, the airflow depends on the impedance between all the plenums 310, 350, 360 of plenum system 300 and the cage 20, 22, which is preferably a constant, stable parameter. More specifically, according to the number of cages 20, 22 present in ventilated rack system 10, the air pressure will be adjusted to compensate for the airflow impedance introduced by each cage 20, 22. Referring to the embodiment shown in FIGS. 37-38, plenum system 300 includes a control system constructed and arranged to make such adjustments, for example, by adjusting the fan speed of the air supply blower 370 and or exhaust blower 380.

Plenum system 300 preferably includes a thermistor 391, more preferably a metal electrode leadless face (MELF) thermistor. Thermistors commonly used in ventilated rack system usually include a lead to provide an electrical connection between the printed circuit board (pcb) and a bead. Because the bead is usually heated to a temperature higher than its surroundings, heat loss through the leads can introduce error into the calculation of heat loss from the ambient fluid flow. Leadless thermistor 391 preferably provides improved thermal coupling to a printed circuit board (pcb) 394, thus reducing the error caused by the introduction of heat loss through the lead.

A bead is preferably a negative temperature coefficient bead into which electrical energy is supplied. The heat loss due to convection is preferably separated from the heat loss due to conduction and radiation, and the velocity of the ambient fluid can be calculated with less error than a thermistor commonly used in previous plenum systems.

In accordance with an exemplary embodiment of control system, one or more pads, preferably two pads placed directly on the surface of pcb 394 can replace the previously used leads. The pads can reduce the cost and labor of assembling the control system. The temperature difference between pcb 394 and the bead is preferably kept constant, thus maintaining the error caused by the increased thermal coupling between pcb 394 and the bead constant. Therefore, because the error is constant, it can be accounted for in the calibration.

In accordance with an exemplary embodiment of control system, a first heater system maintains the bead at a constant temperature, and a second heater system 398 maintains a pcb area 395 of pcb 394 surrounding the bead at a constant temperature, thus further reducing error. Additionally, actively forcing pcb 394 to the desired temperature can reduce the time it takes the control system to reach thermal equilibrium. Referring to the embodiment shown in FIG. 38, the first heater system can be provided in quadrant 6D and 5C and the second heater system 398 in quadrant 6B and 5B. Second heater system 398 preferably maintains the pcb area at a constant temperature below the temperature of bead 396 but above ambient temperature. Preferably, second heater system 398 can cool as well as heat.

Control system preferably actively measures the temperature of the surrounding pcb. Therefore, rather than controlling the pcb temperature as previously practiced, the temperature can be measured and accounted for in the analysis. An example of a suitable formula is Modified King's law, which provides $$\text{Power} = K_1(\text{Vel})^p(T_{bead} - T_{ambient}) + K_2(T_{bead} - T_{ambient}) + K_3$$

wherein:
Vel: velocity of fluid
$T_{bead}$: Temperature of bead
$T_{ambient}$: Temperature of ambient fluid
p: empirically determined constant (~1.5-4)
$K_1, K_2$: empirically determined constants as stated in King's law
$K_3$: constant to account for heat absorbed by pcb The first term, $K_1(\text{Vel})^p(T_{bead} - T_{ambient})$, is a convective term, which is zero when the velocity is zero. The second term, $K_2(T_{bead} - T_{ambient})$, is a conductive term, which depends on the temperature difference between the bead and the ambient fluid. If the temperature difference is zero, heat is neither added to nor removed from the bead. The third term, $K_3$, is a conductive term through the leads, which is constant because the bead and the surrounding pcb are kept at constant temperatures via the control system.

Figure 37:
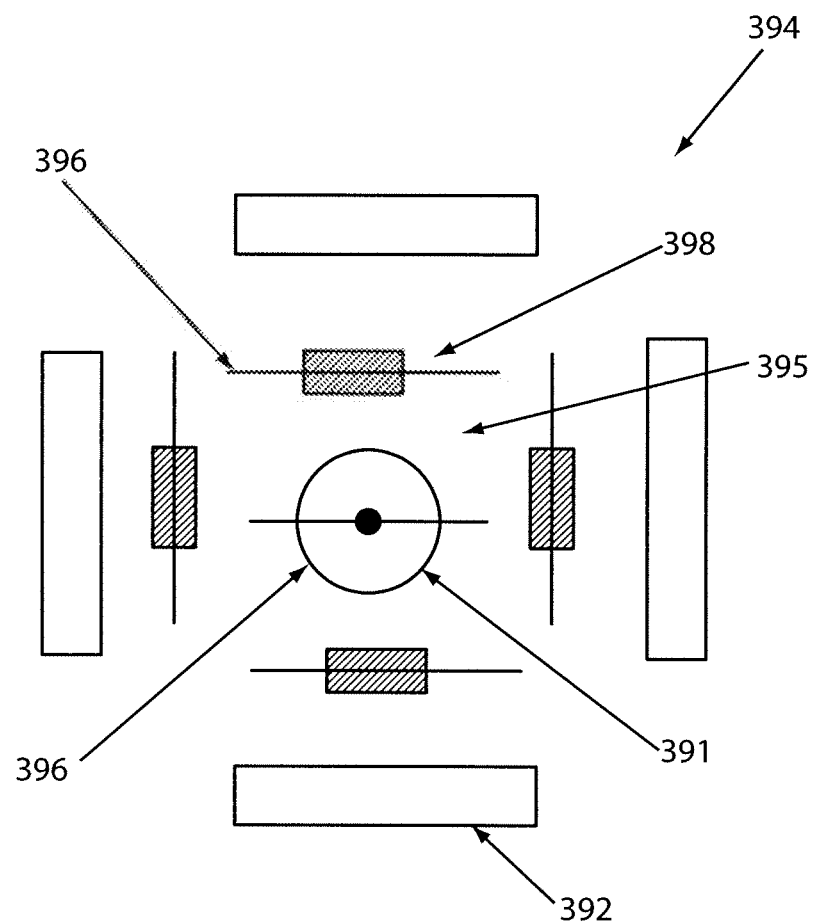
FIG. 37 is a schematic diagram of a portion of a control circuit in accordance with an embodiment of the invention.
Figure 38A:
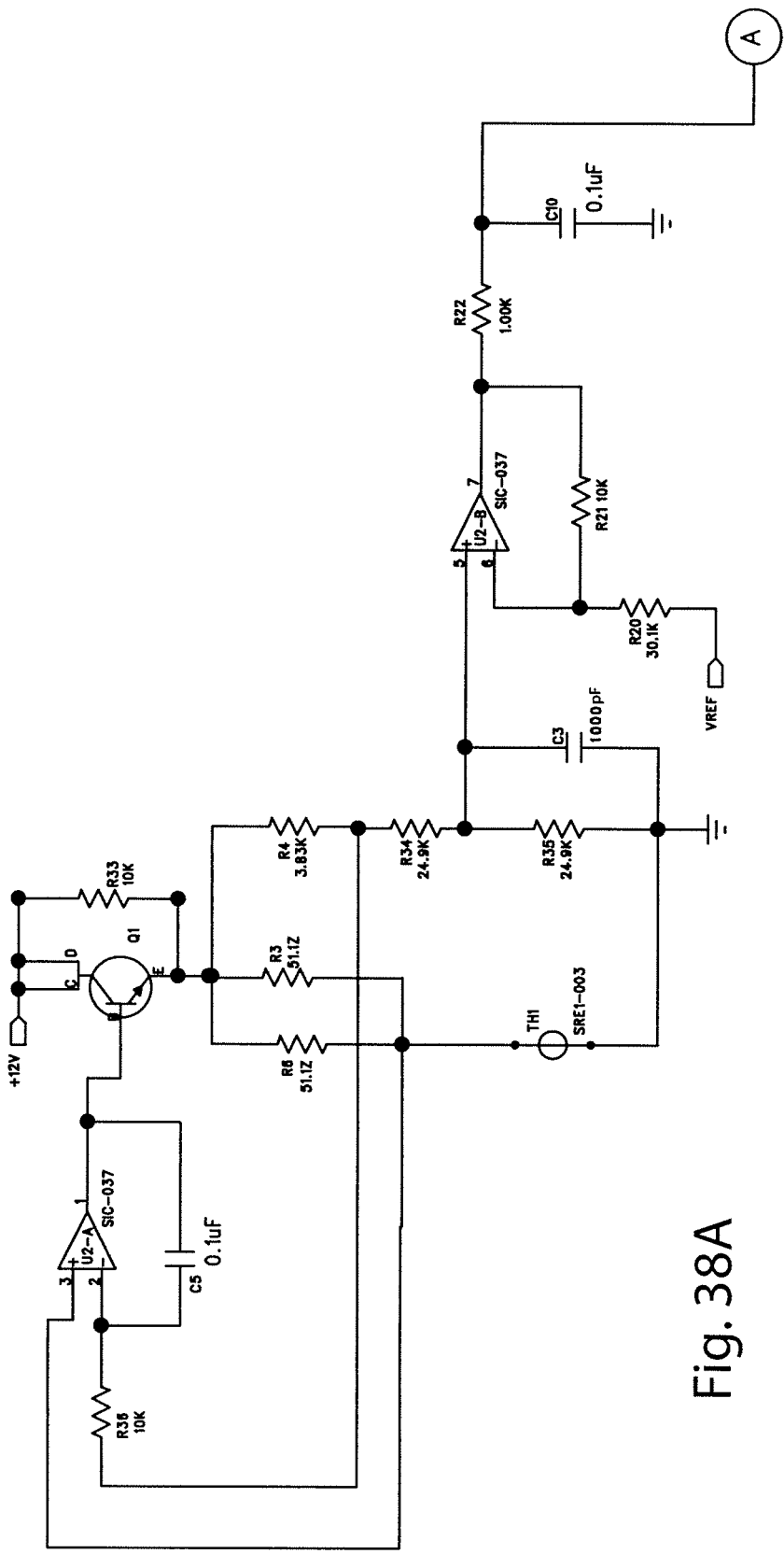
Figure 38B:
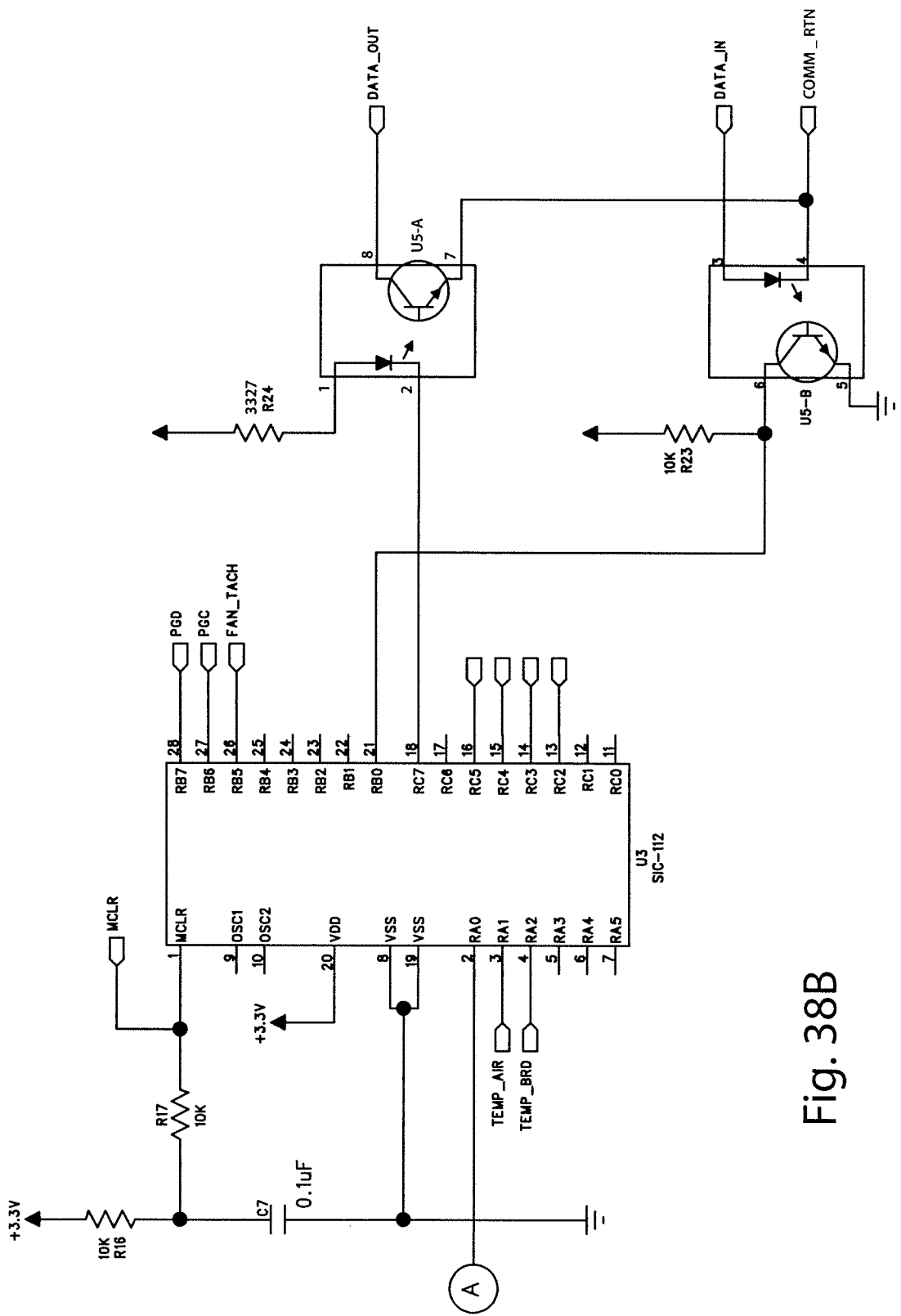
Figure 38C:
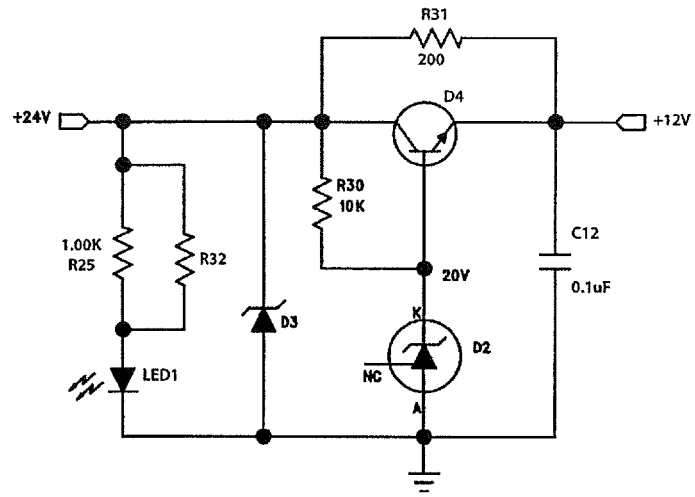
Figure 38D:
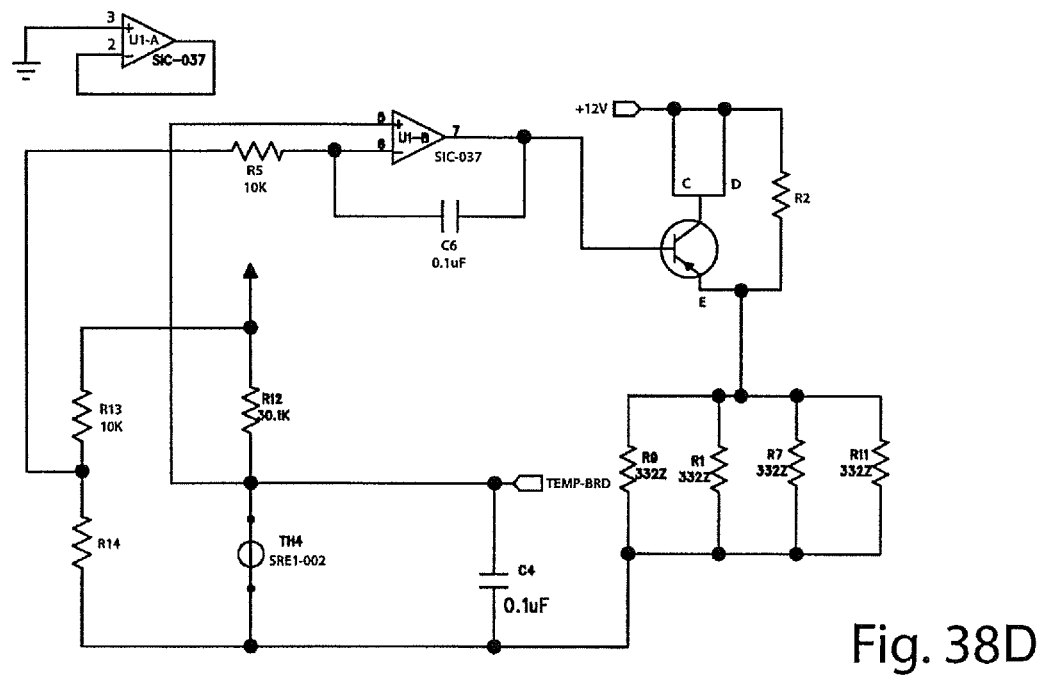
Figure 38E:
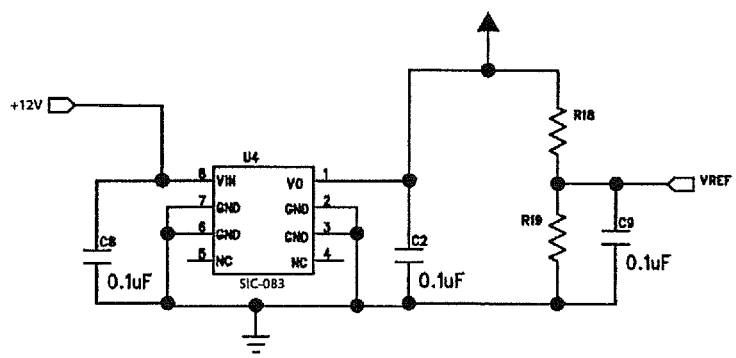

Preferably, one or more air gaps 392 are provided around thermistor 391 to facilitate thermally isolate pcb 394. Air gaps 392 preferably also reduce pcb mass and reduce the time to reach thermal equilibrium. Additionally, second heating system 398 and thermistor 391 preferably include a constant temperature drive circuit 396 as shown in FIG. 37.

Ventilated Cage and Rack Assembly System

An exemplary embodiment of the invention provides a ventilated rack system 10 that can be assembled by the end user, for example, at a laboratory facility. The components of ventilated rack system 10 can be provided in a single unit, individually, or in groups. For example, the ventilated rack system 10 or components thereof can be provided in a box or other suitable container, as components ready for assembly, which can preferably be assembled using simple tools. The disassembled components can be stored until needed, whereupon the user can assemble the components to form ventilated rack system 10. Therefore, less storage space is required than a pre-assembled ventilated rack system. Therefore, rather waiting until a ventilated rack is needed, a laboratory can purchase one or more ventilated cage and rack systems 10 in advance and assemble the components at a later time when needed.

The assembly process of ventilated rack system 10 in accordance with an exemplary embodiment of the invention will be described herein. First, wheels 112 are preferably attached to base 110 to provide mobility to ventilated rack system 10 as shown in FIGS. 2-3. Wheels 112 can facilitate transport of ventilated rack system 10 to and from the laboratory facilities, such as experiment rooms, cleaning rooms, autoclaving areas, etc. In the embodiment shown, four wheels 112 are connected to base 110, one wheel 112 at each corner of base 110. It is to be understood that the number and location of wheels 112 can be varied without deviating from the scope of the invention.

Figure 4:
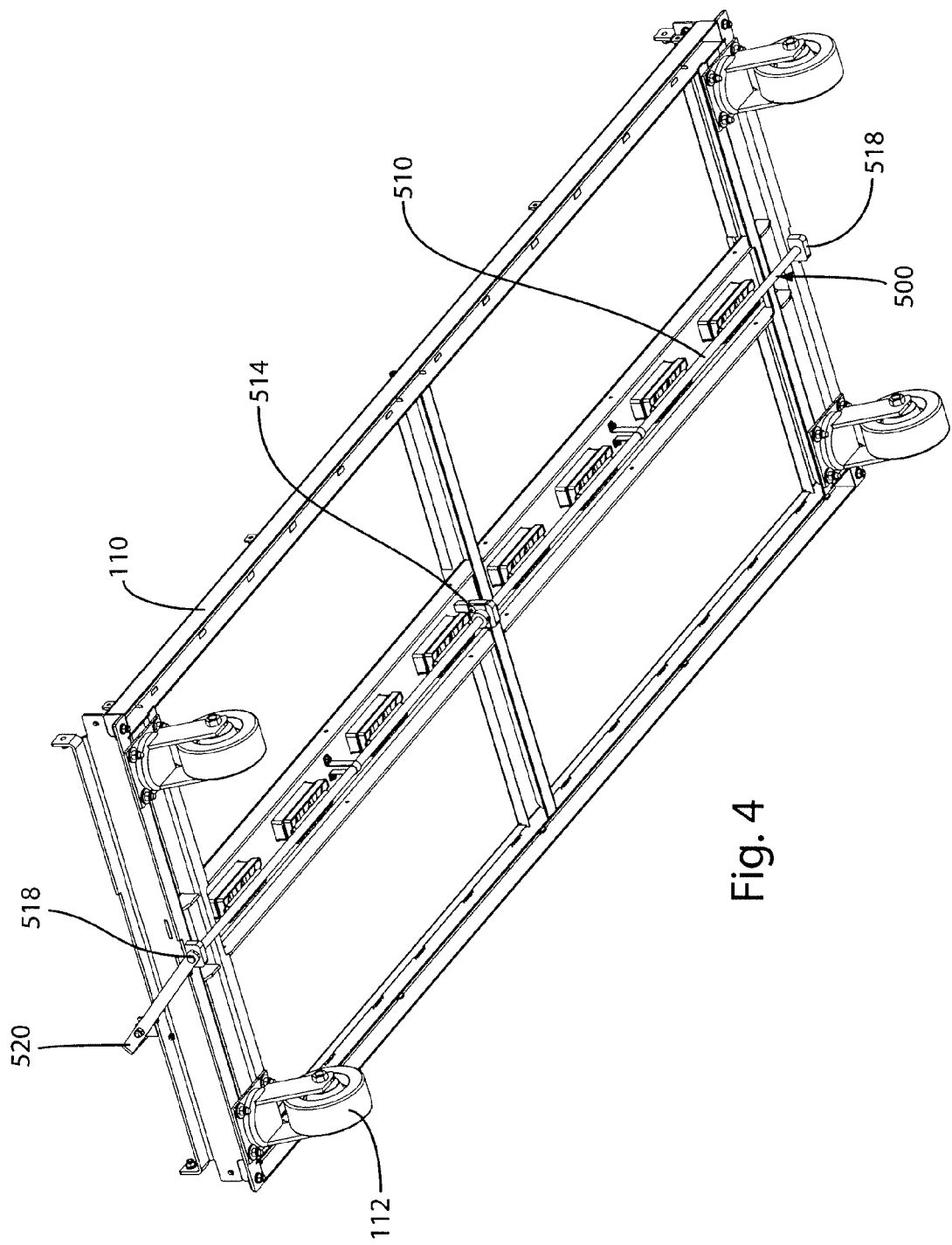
FIG. 4 is a another perspective view of a the base of FIG. 2.
Figure 6:
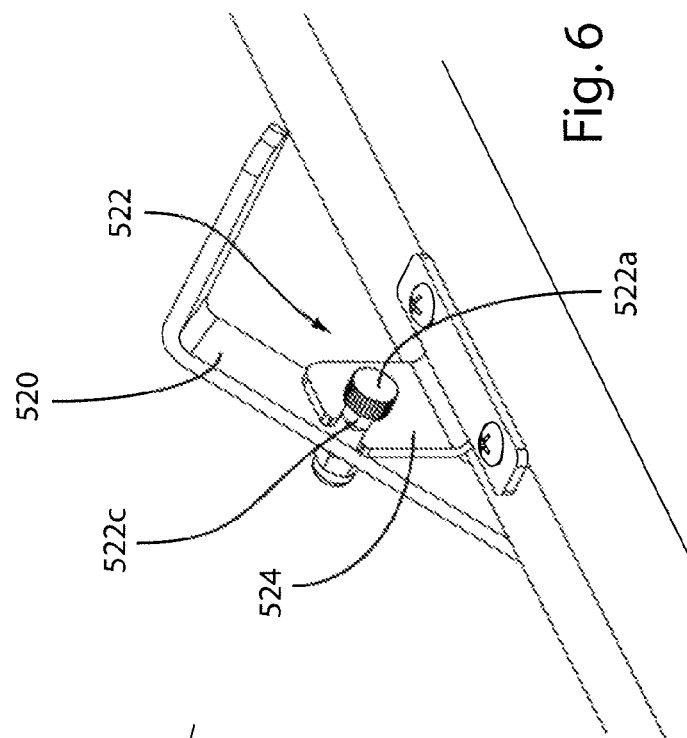
FIG. 6 is a reverse perspective view of FIG. 5.
Figure 5:
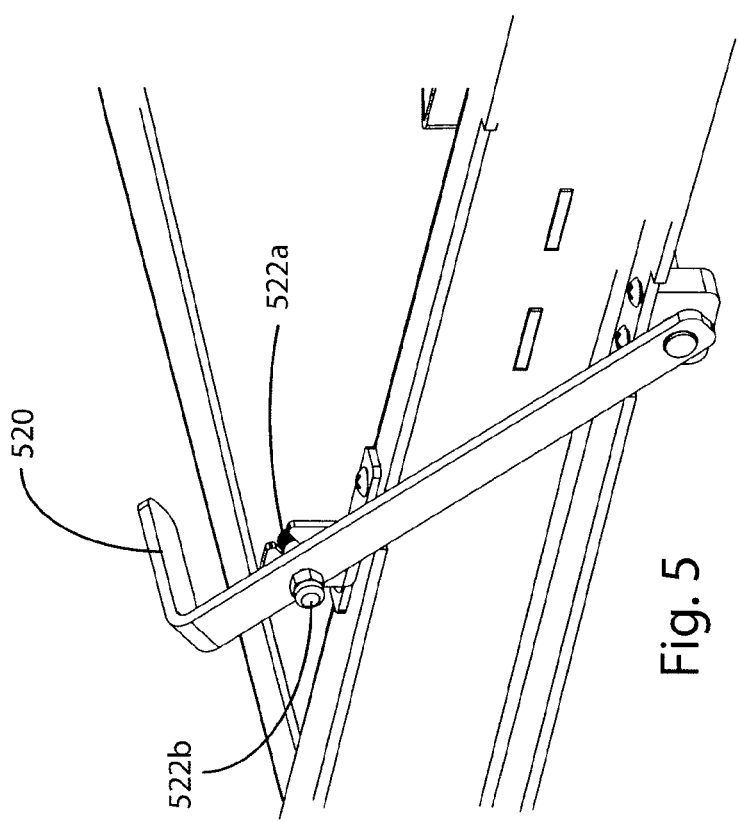
FIG. 5 is a perspective view of a clean-out gate lever in accordance with an embodiment of the invention.
Figure 7:
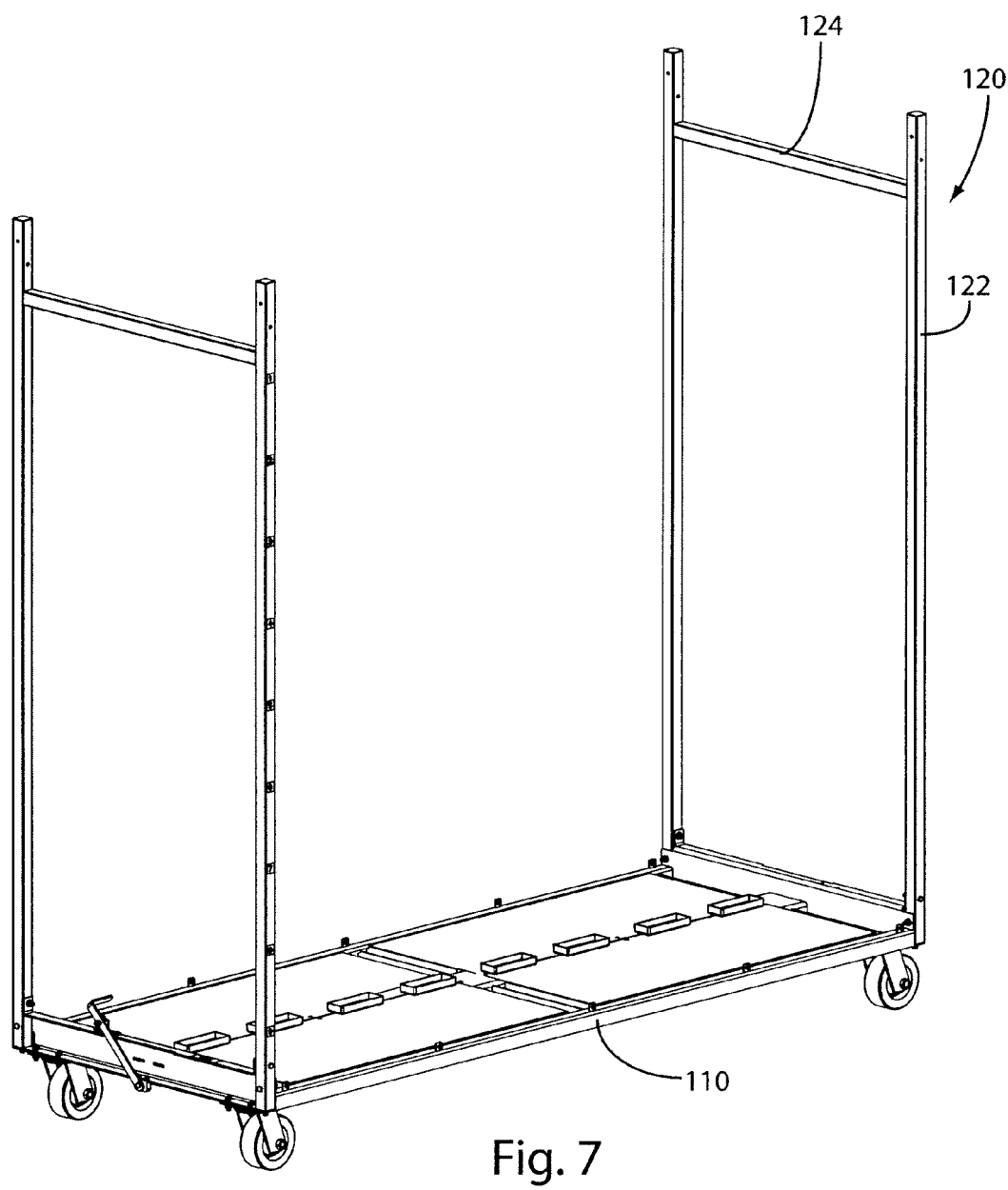
FIG. 7 is a perspective view of a partially assembled rack system in accordance with an embodiment of the invention.

Reference is made to FIGS. 4-6. Base 110 preferably includes one or more rod end supports 578 and a rod support 514 attached thereto. Alternatively, rod end supports 518 and rod support 514 can be attached to base 110 via nuts and bolts or other suitable attaching mechanisms. A rod 510 and a lever 520 can be added to base 110, rod 510 preferably constructed and arranged to be supported by rod support 514 and connected to lever 520. A rod positioning assembly 516 can be positioned on either side of rod support 514 to substantially prevent rod 510 from shifting in a lateral direction. Preferably, each end of rod 510 is connected to rod end support 518 to further prevent lateral movement of rod 510. Base 110 can include a plurality of aperture 114 and rod 510 can include a plurality of stoppers 512. An example of stoppers 512 include smaller rods welded or otherwise connected to rod 510. Rod 510 is preferably positioned so that stoppers 512 are beneath and aligned with aperture 114.

One end of rod 510 can then be connected to lever 520, preferably with a rod end support 518 positioned there between, such that the movement of lever 520 rotates rod 510. In the embodiment shown in FIGS. 5-6, a lever lock 522 having a head portion 522a and a rod portion 522b can be attached to lever 520 such that rod portion 522b extends through lever 520 and head portion 522b is spaced apart from lever 520. Lever lock 522 can include a lock portion 522c between head portion 522a and rod portion 522b. Lever lock 522 can be attached to lever 520 by the user or, alternatively, be provided pre-assembled onto lever 520.

A lock base 524 can be attached to base 110, lock base 524 constructed and arranged to support, preferably receive, lever lock 522. Lock base 524 can include a groove for receiving the lock portion 522c, such that lever 520 is on one side and the head portion 522a is on the other side of lock base 524. Lever 520 is preferably positioned such that lever lock 522 is received by lock base 524. Lock base 524 can be provided pre-assembled on base 110 or assembled by the user.

Side frames 120, preferably having two side vertical beams 122 and a side top beam 124, can be connected to base 110 such that side vertical beams 122 extend upward from base 110 and side top beam 124 is parallel to base 110. Side vertical beams 122 preferably include projections and base 110 includes recesses constructed and arranged to receive the projections to facilitate proper alignment. Nuts and bolts can be used to secure side vertical beams 122 and base 110. A bracket can also be used.

Reference is made to FIGS. 8A-8D. After side frames 120 are attached to base 110, rear frame 130 is preferably connected to both base 110 and side frames 120. Rear frame 130 preferably includes rear vertical beams 132 extending upward from base 110 and parallel with side vertical beams. A rear top beam 134 preferably extends above and is connected to rear vertical beams 132, and further extends in parallel to base 110. Rear top beam 134 can be connected to the top of side vertical beams 122 and secured via a top bracket 138, rear top beam 134 preferably positioned above side top beam 124. Top bracket 138 preferably extends above a portion of the top of rear top beam 134 and along a portion of the side of side vertical beam 122. Preferably, top bracket 138 also extends a third side, covering portions of the sides if both rear top beam 134 and side vertical beam 122. Top bracket 138 can be secured using a plurality of nuts and bolts as shown in FIG. 8D.

Rear vertical beams 132 can be secured to rear top beam 134 and base 110 with a plurality of connectors 136, preferably S-shaped connectors 136. Connector 136 preferably includes an end 136a and a middle portion 136b, wherein end 136a can be connected, using a nut and bolt, to rear vertical beam 132, and middle portion 136b can similarly be connected to base 110 or rear top beam 134.

Figure 9:
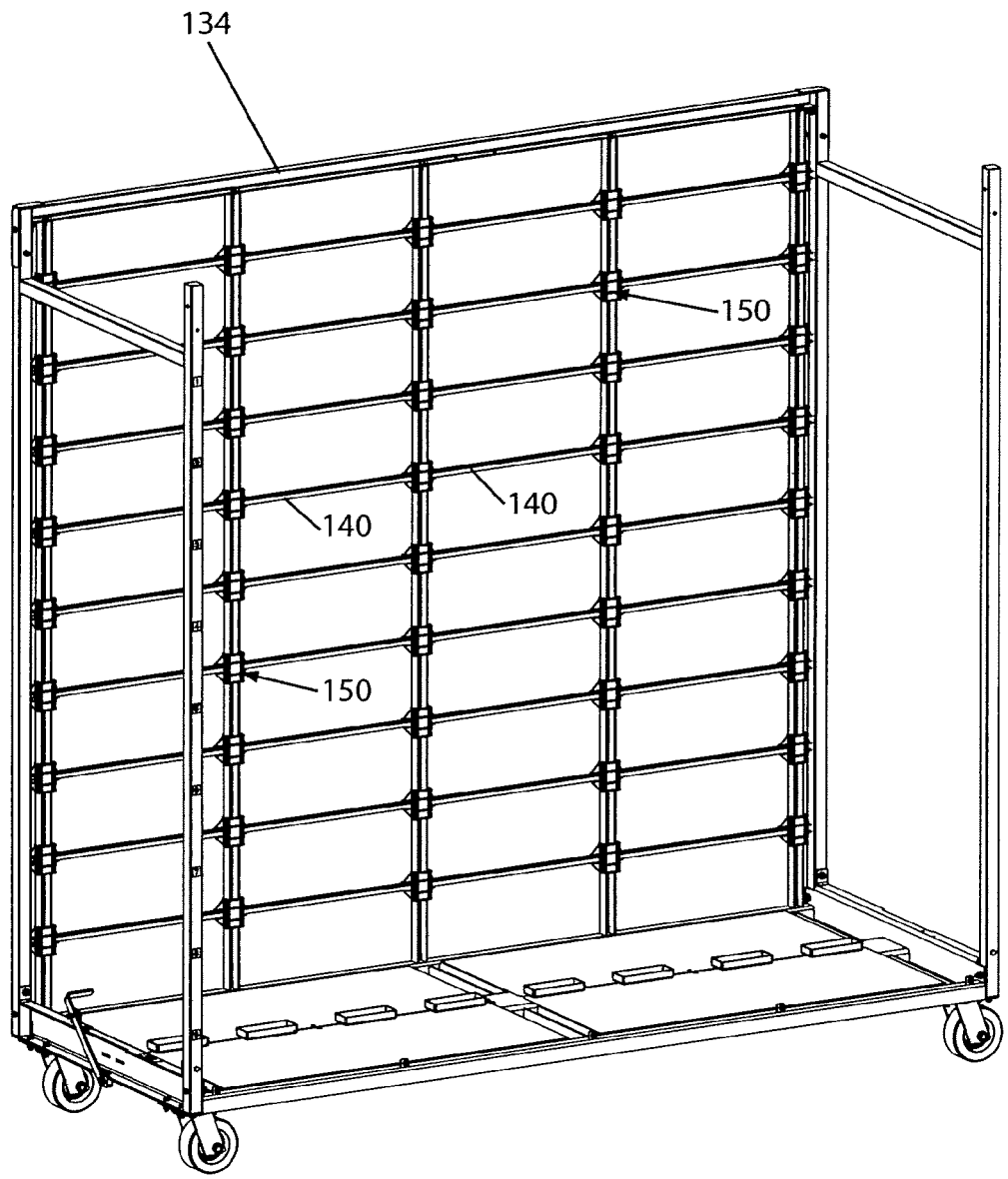
FIG. 9 is a perspective view of a partially assembled rack system in accordance with an embodiment of the invention.

Referring to FIGS. 9-10, a plurality of rear support beams 140 can thereafter be positioned transverse to rear vertical beams 132, preferably parallel to base 110, and secured by a retainer assembly 150. In the embodiment shown, one retainer assembly 150 is used to secure each intersection of rear support beam 140 and rear vertical beam 132.

As illustrated in FIG. 11, an embodiment of retainer assembly 150 includes a cross connector 152a and a retainer 152b, which interlock to retain rear vertical beam 132 and rear support beam 140 in place. In accordance with the embodiment of retainer assembly 150 shown, cross connector 152a is placed on rear support beam 140 to receive a portion of rear support beam 140 in second connector channel 156. Cross connector 152a is then placed on rear vertical beam 132 to receive rear vertical beam 132 in first connector channel 154a. Retainer 152b can be placed on the opposite side of rear vertical beam 132 to receive rear vertical beam 132 in retainer channel 154b, and retainer assembly 150 can be locked in place.

As illustrated in FIG. 11, an embodiment of retainer assembly 150 includes a cross connector 152a and a retainer 152b, which interlock to retain rear vertical beam 132 and rear support beam 140 in place. In accordance with the embodiment of retainer assembly 150 shown, cross connector 152a is placed on rear vertical beam 132. Cross connector 152a preferably includes a protruding pin (not shown) constructed and arranged to be received by a corresponding aperture 132a in rear vertical beam 132 as shown in FIG. 8C. The rear support beam 140 is preferably placed into cross connector 152a, for example, each end of rear support beam 140 is preferably inserted into a second connector channel 156. Subsequently, retainer 152b can be placed on the opposite side of rear vertical beam 132 to receive rear vertical beam 132 in retainer channel 154b, and retainer assembly 150 can be locked in place with respect to cross connector 152a.

Preferably, cross connector 152a includes connector tabs 158a and retainer 152b includes tab receiving apertures 158b for receiving connector tabs 158a. Retainer 152b preferably also includes retainer tabs 158c such that is connector tabs 158a are received in tab receiving apertures 158b and slid toward retainer tabs 158c, such that retainer tabs 158c prevent cross connector 152a from being inadvertently disconnected from retainer 152b. Preferably, cross connector 152a and retainer 152b are permanently connected once assembled.

Reference is made to FIGS. 2 and 12-15B. A gasket top 530 can be placed in base aperture 114, and a gasket bottom 540 can be placed under base aperture 114. In the embodiment shown in FIGS. 14A-14B, gasket top 530 includes a base insertion portion 538 which is constructed and arranged to be inserted into base aperture 114. Base insertion portion 538 preferably includes one or more gasket projection receiving apertures 534. Gasket top 530 also includes a plenum receiving portion 536 which preferably extend upward from base 110. A plurality of gasket apertures 532 is also provided in the embodiment shown. An embodiment of gasket bottom 540 shown in FIGS. 15A-B includes a gasket bottom base 542 and one or more gasket projections 544 constructed and arranged to be received by gasket projection receiving apertures 534 of gasket top 530 to prevent lateral displacement of gasket bottom 540 from gasket top 530. Preferably, base insertion portion 538 is connected to gasket bottom 540 beneath base 110.

Figure 13:
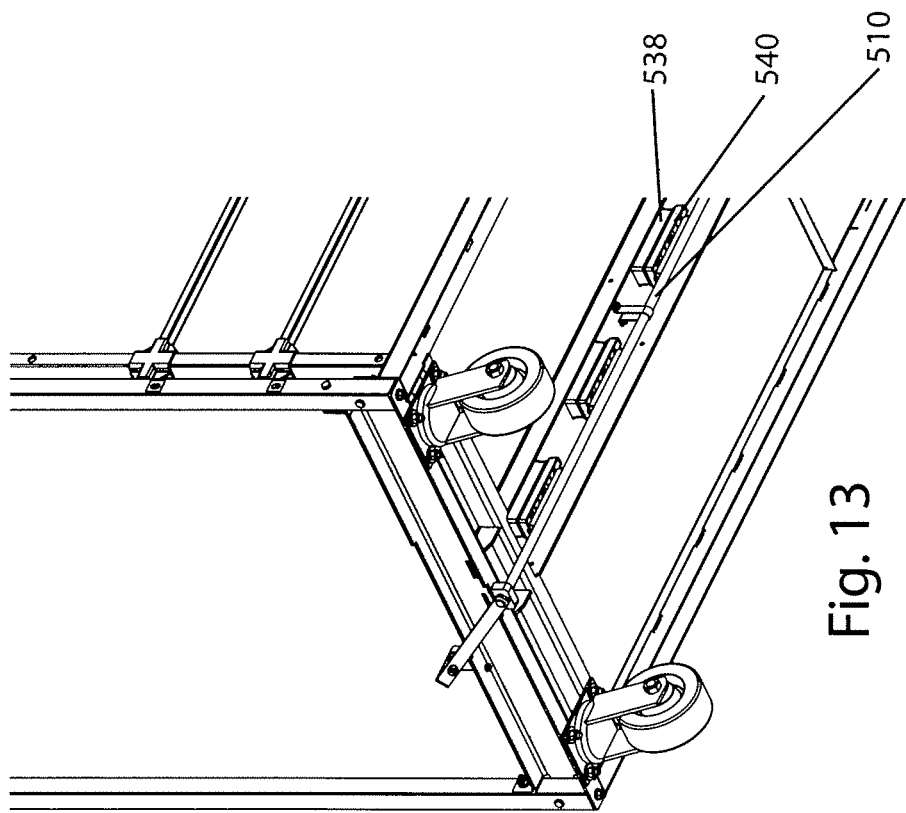
FIG. 13 is a reverse perspective view of FIG. 12.
Figure 12:
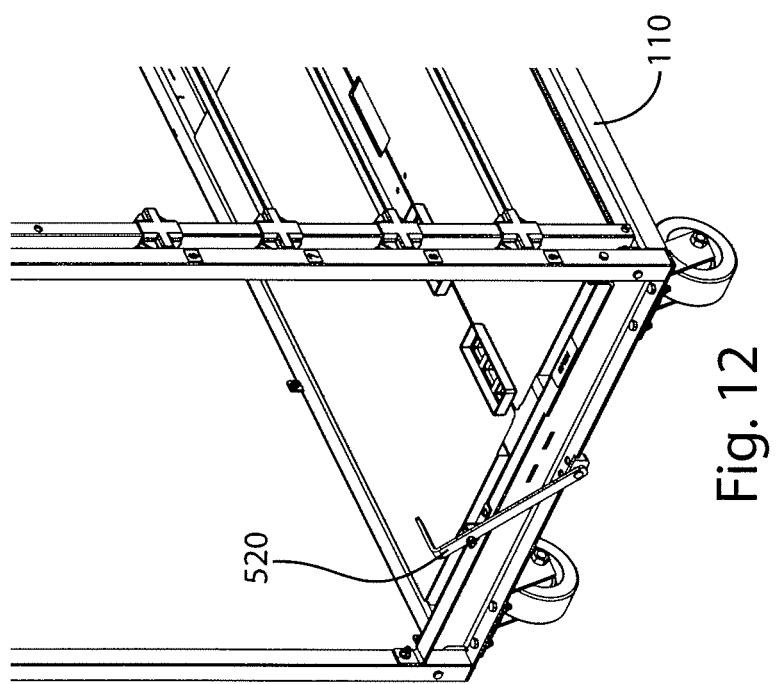
FIG. 12 is a partial perspective view of a partially assembled rack system in accordance with an embodiment of the invention.
Figure 14A:
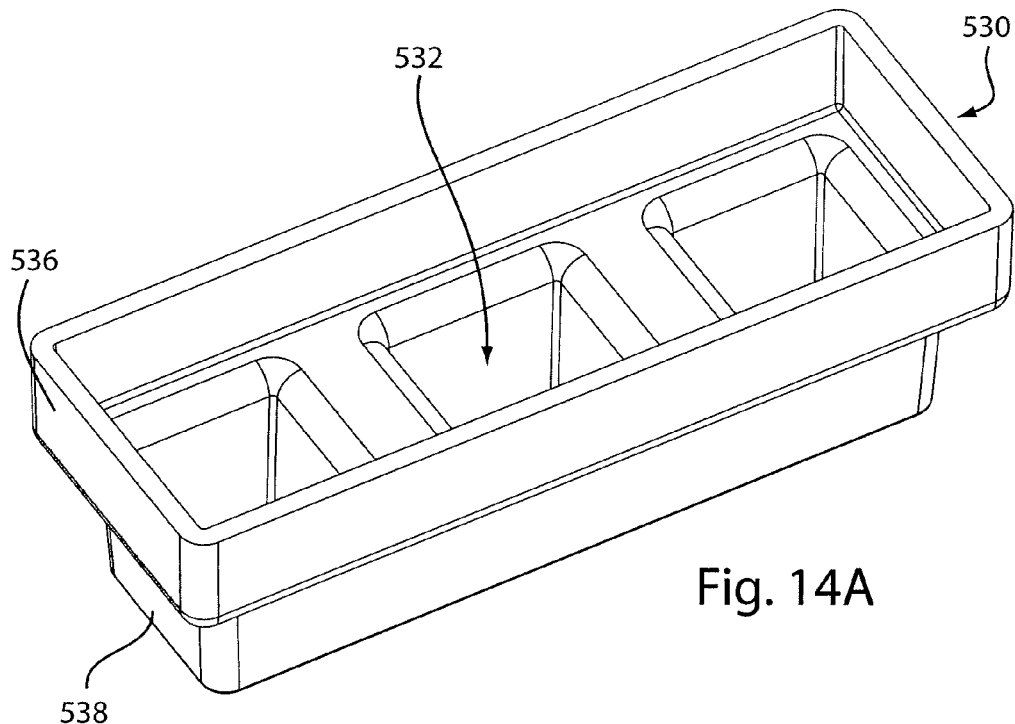
FIG. 14A is a perspective view of a portion of a clean-out gate gasket in accordance with an embodiment of the invention.
Figure 14B:
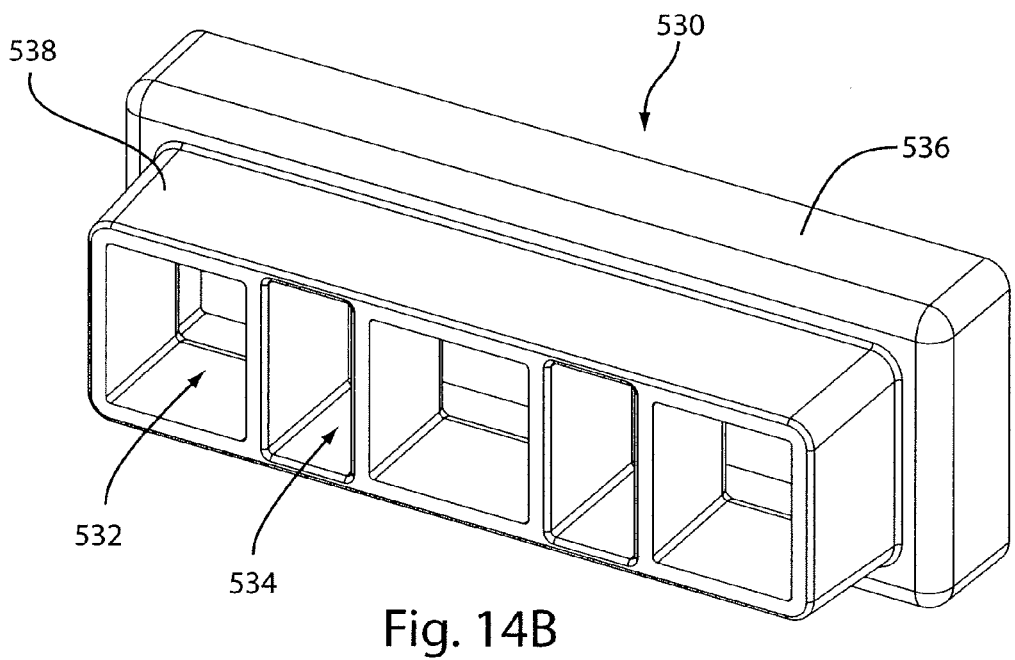
FIG. 14B is another perspective view of the portion of a clean-out gate gasket of FIG. 14A.
Figure 15A:
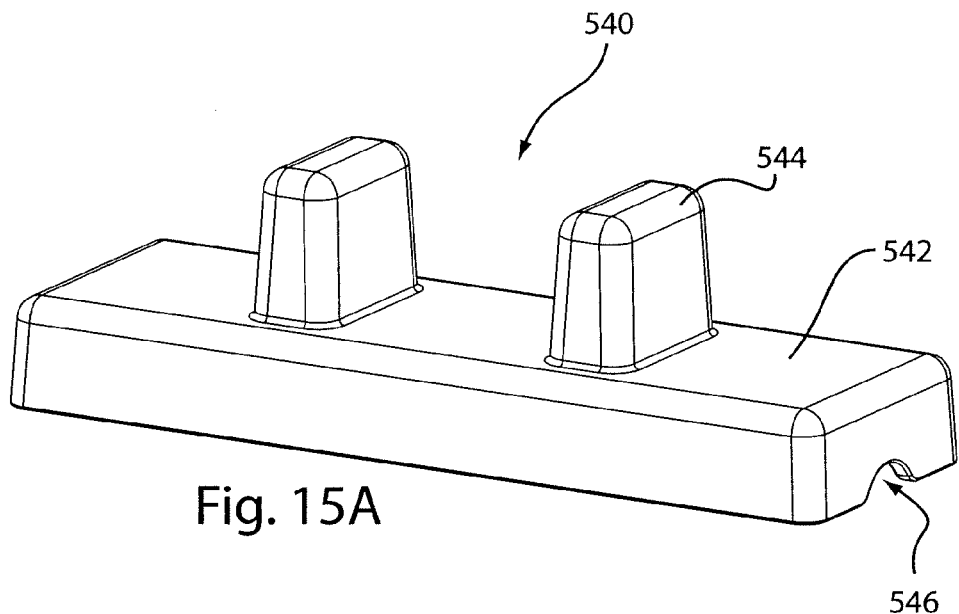
FIG. 15A is a perspective view of a portion of a clean-out gate gasket in accordance with an embodiment of the invention.
Figure 15B:
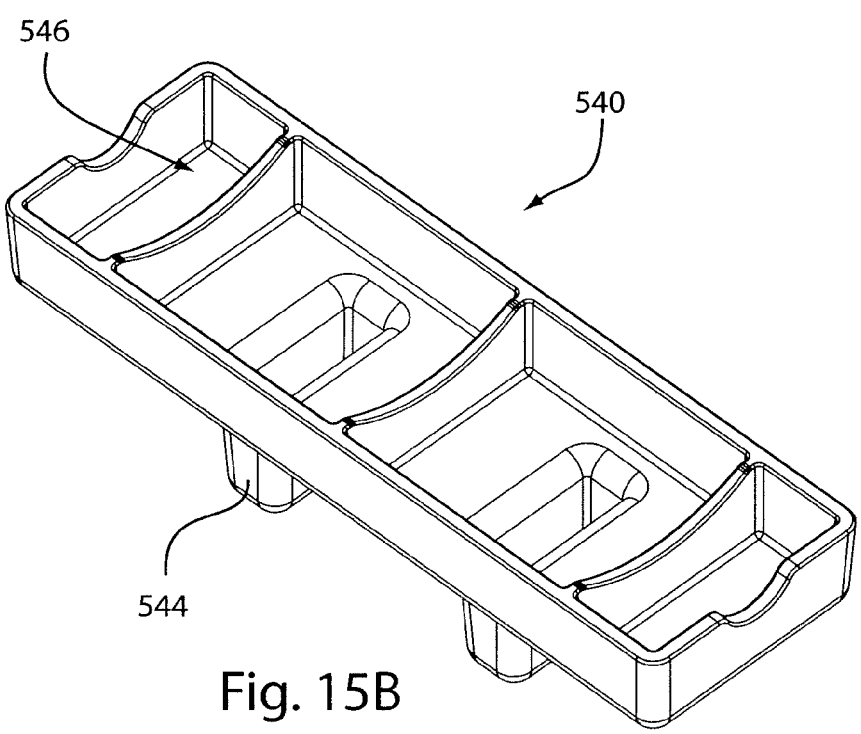
FIG. 15B is another perspective view of the portion of a clean-out gate gasket of FIG. 15A.

Gasket bottom 540 can also include a stopper receiving channel 546 constructed and arranged to receive a stopper 512 of rod 510 as shown in FIG. 30A. Preferably, gasket bottom 540 is positioned to receive stopper 512 in stopper receiving channel 546 and gasket top 530 is inserted into base aperture 114 until gasket projection receiving apertures 534 receive corresponding gasket projections 544 as illustrated in FIGS. 12-13.

Referring to FIGS. 16-20, an exemplary embodiment of vertical plenum 310 includes three channels 320, 330 extending vertically there through: an air supply channel 320 and two exhaust channels 330. The air supply channel 320 is preferably located between the two exhaust channels 330. Channels 320, 330 can be substantially aligned with gasket apertures 532 as vertical plenum 310 is inserted into gasket top 530.

Figure 19A:
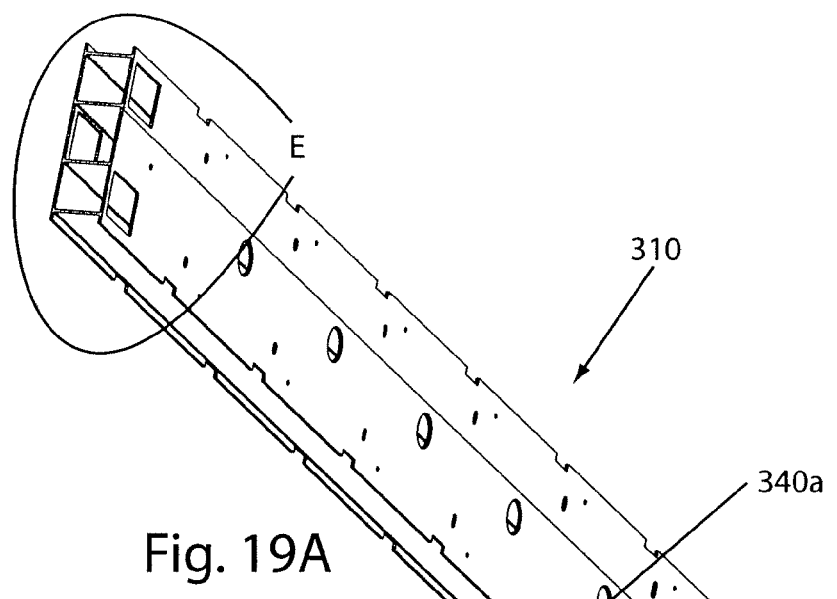
FIG. 19A is a perspective view of an air plenum in accordance with an embodiment of the invention.
Figure 19B:
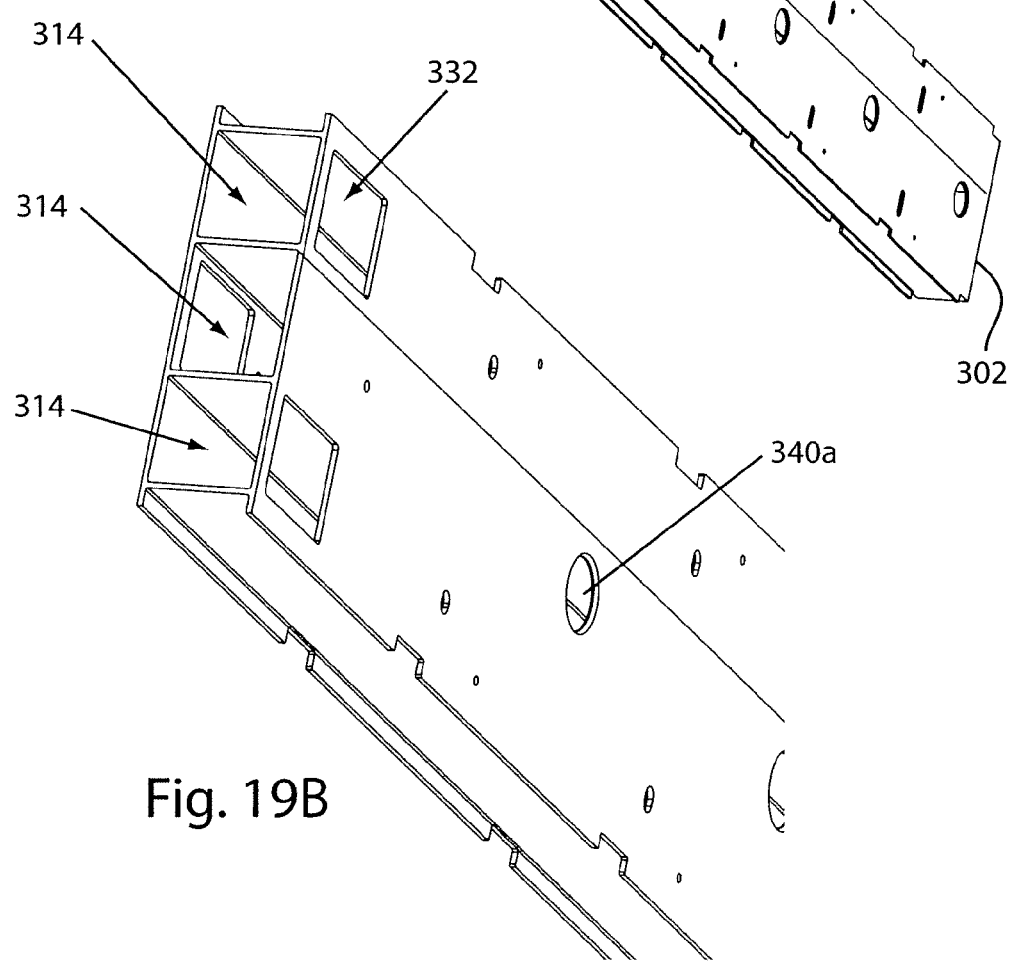
FIG. 19B is an enlarged perspective view of area E of FIG. 19A.
Figure 19C:
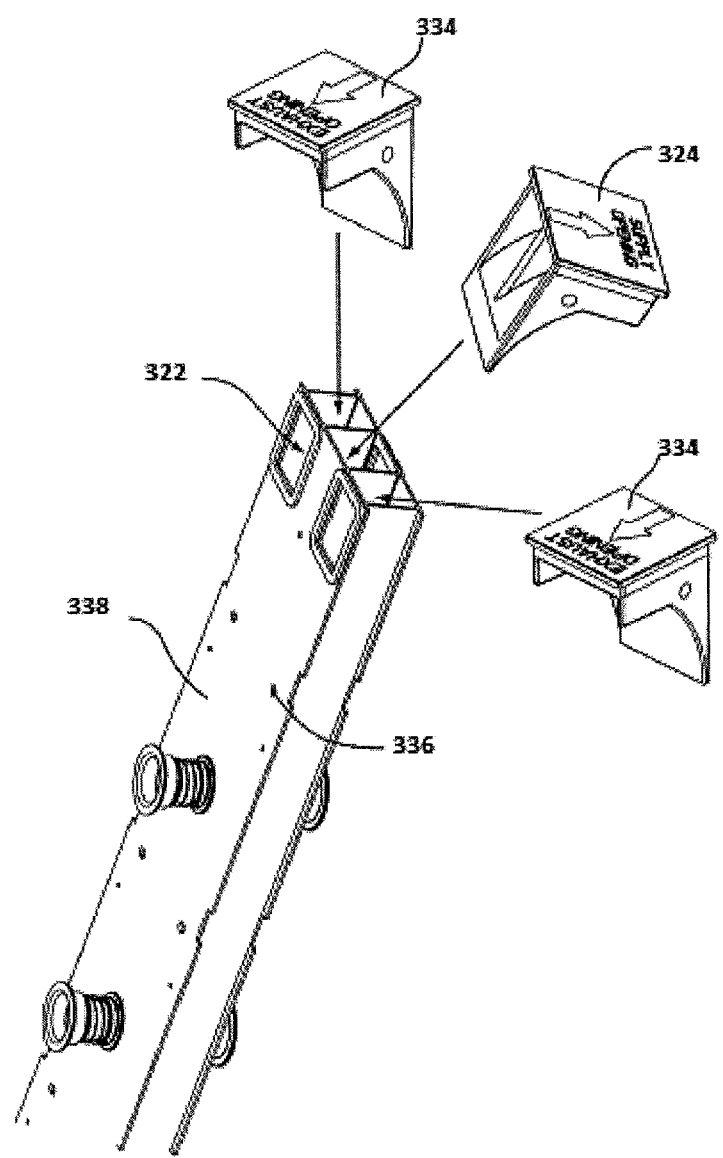
FIG. 19C is a partial perspective view of an air plenum in accordance with an embodiment of the invention.
Figure 20:
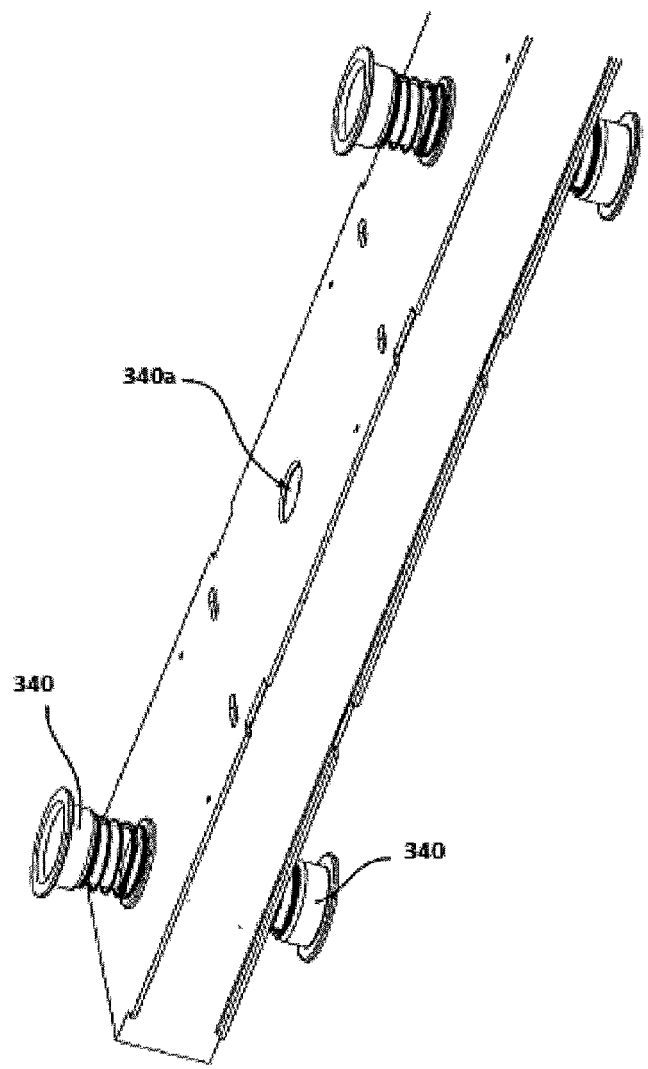
FIG. 20 is a partial perspective view of an air plenum and an air dock in accordance with an embodiment of the invention.

Referring to the embodiment shown in FIGS. 19A-C, air supply channel 320 has an air supply port 322 and likewise, exhaust channel has an exhaust port 332. Preferably, vertical plenum 310 is positioned such that air supply port 322 and exhaust ports 332 are proximate the top of rack 100 and air supply channel 320 and exhaust channels 330 are exposed proximate the bottom of vertical plenum 310. One or more air supply caps 324 and exhaust caps 334 can be placed proximate the top of vertical plenum 310 to facilitate sealing of vertical plenum and directing air into or out of air supply port 322 and exhaust port 332. In the embodiment shown in FIG. 19C, air supply cap 324 and exhaust cap 334 include a marking such as an arrow to indicate the direction of airflow to facilitate proper placement.

Vertical plenum 310 preferably includes a plurality of air supply docking assemblies 340 along vertical plenum 310, air supply docking assemblies 340 being in fluid communication with air supply channel 320 to provide air therefrom. For example, if a cage is connected to air supply docking assembly 340, air from air supply channel 320 can be provided through air supply docking assembly 340 into the cage. Air supply docking assemblies 340 can be pre-assembled on vertical plenum 310. More preferably, air supply docking assemblies 340 are inserted into corresponding docking apertures 340a in vertical plenum 310 until secure. Alternatively, a separate attaching mechanism can be provided. By way of non-limiting example, one or more screws, nails, bolts and washers, etc. can be used to secure air supply docking assemblies 340 to vertical plenum 310. In accordance with an exemplary embodiment air supply docking assembly 340 creates a seal with vertical plenum 310 to prevent leakage of air from between air supply docking assembly 340 and vertical plenum 310.

Figure 21:
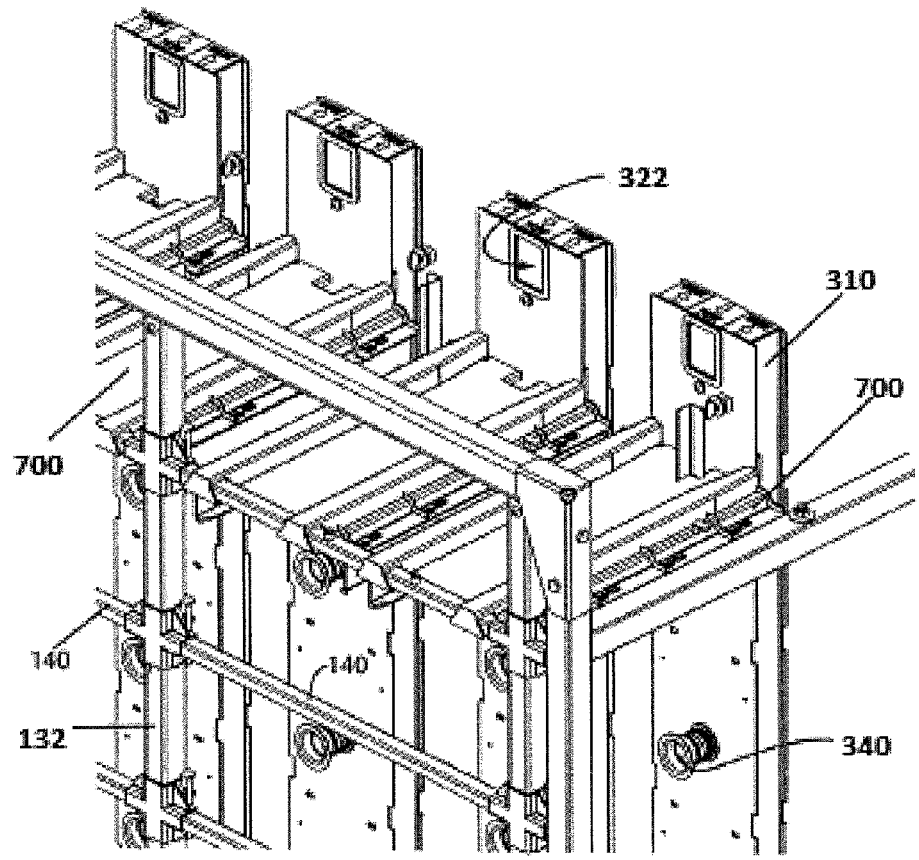
FIG. 21 is a partial perspective view of a partially assembled rack system in accordance with an embodiment of the invention.
Figure 22:
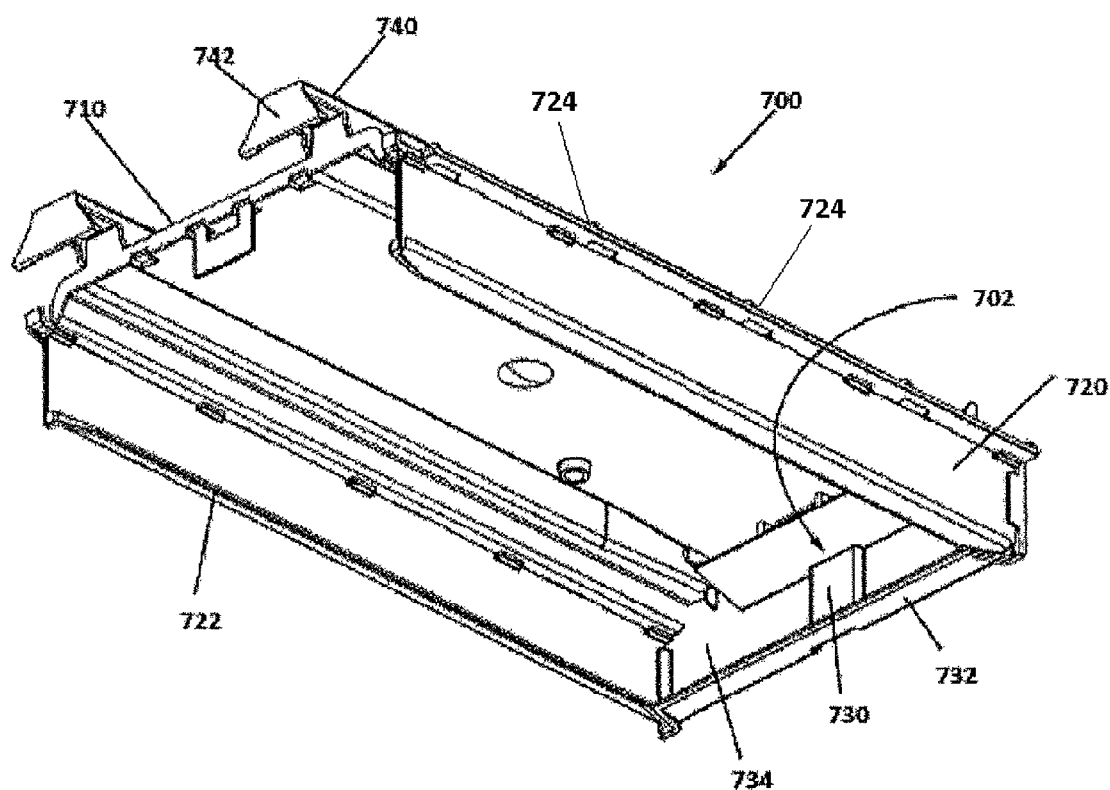
FIG. 22 is a perspective view of a canopy in accordance with an embodiment of the invention.
Figure 23:
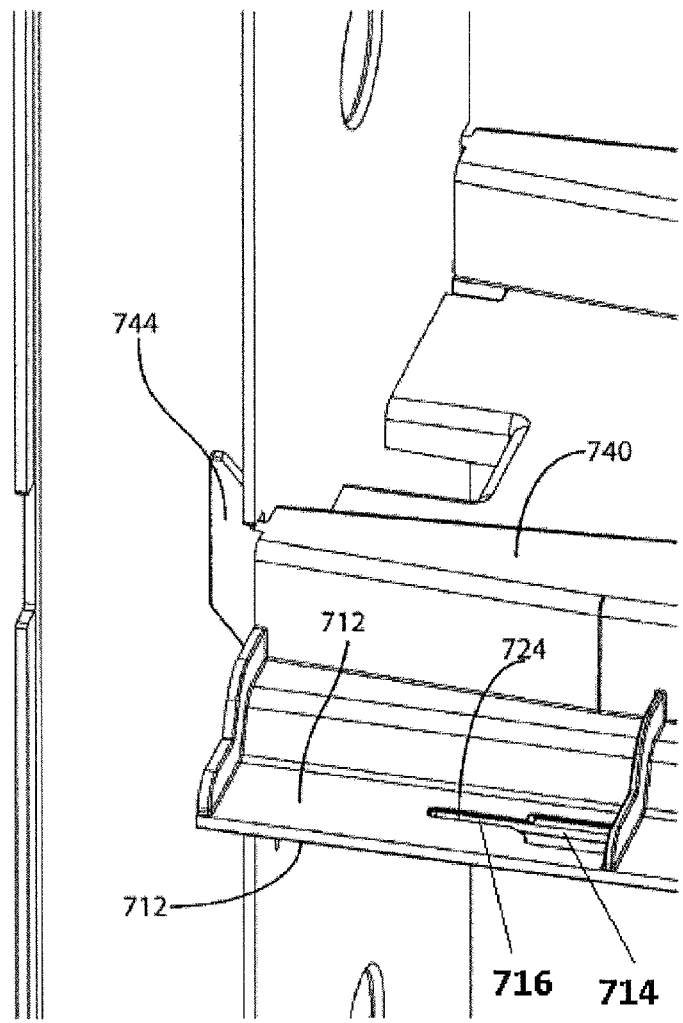
FIG. 23 is a partial perspective view of a canopy and rack system in accordance with an embodiment of the invention.
Figure 24:
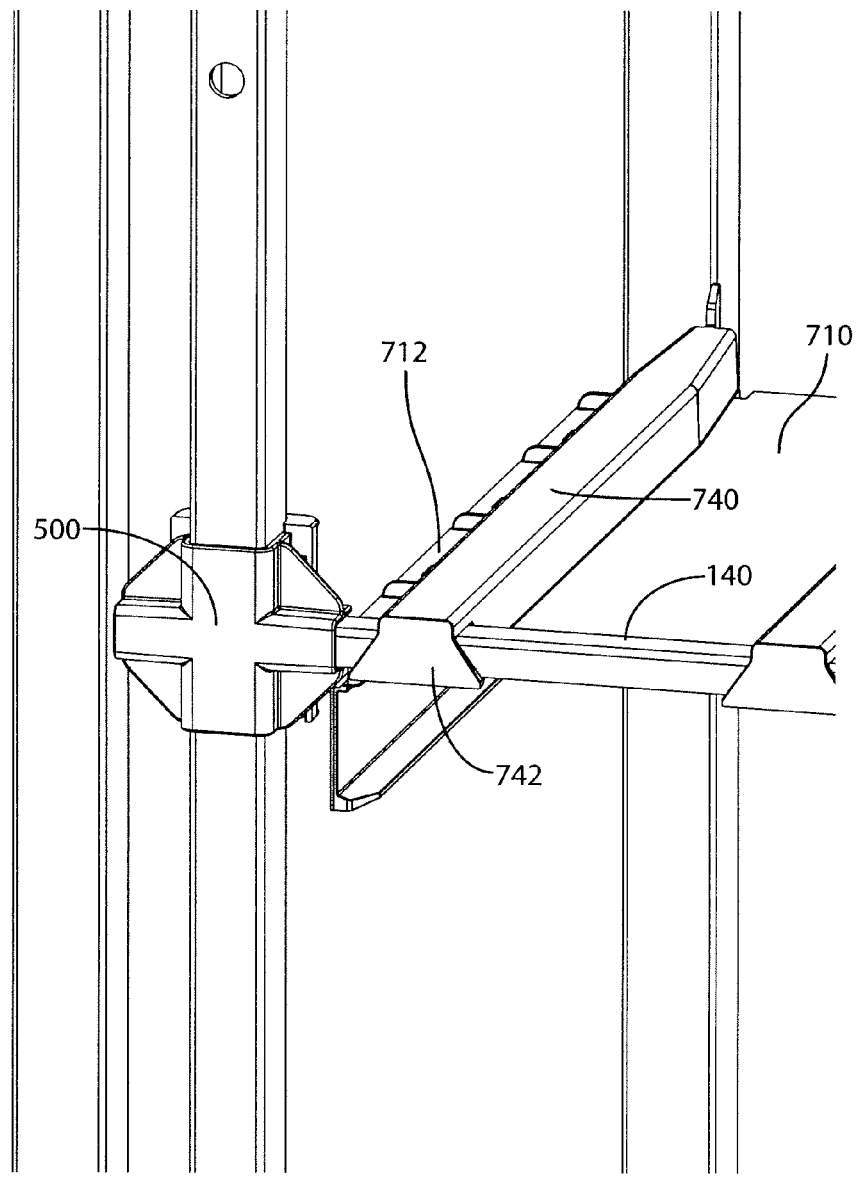
FIG. 24 is a partial perspective view of a canopy and rack system in accordance with an embodiment of the invention.

In accordance with the embodiment illustrated in FIGS. 21-24, canopies 700 can be positioned between vertical plenum 310 and rear support beam 140. An exemplary embodiment of canopy 700 is shown in FIG. 22, wherein canopy 700 includes a canopy top 710, one or more canopy sides 720 and a canopy rear 730. Canopy top can include one or more canopy support beams 740 constructed and arranged to extend from vertical plenum 310 to rear support beam 140. Canopy support beam 740 preferably includes a canopy support flange 742 and vertical plenum preferably includes a flange receiving member 312. Flange receiving member 312 can be a groove or cut-out, such as the embodiment shown in FIG. 23. Alternatively, flange receiving groove 312 can be an aperture through which canopy support flange 742 can be inserted. It is to be understood that other variations of flange receiving member 312 and canopy support flange 742 are contemplated without deviating from the scope of the invention.

The opposite end of canopy support beam 740 from canopy support flange 742 preferably extends past canopy top 710 and includes a canopy support tab 744. Referring to the embodiment illustrated in FIG. 24, a portion of canopy support beam 740 extends above and past rear support beam 140, canopy support flange 742 being supported by rear support beam 140. Canopy support tab 744 can extend downward from canopy support beam 740 such that rear support beam 140 is surrounded on at least two sides by canopy support beam 740 and canopy support tab 744. Preferably, canopy support tab 744 includes a flange extending beneath rear support beam 740 for additional security. However, it is to be understood that canopy support tab 744 can extend partially across rear support beam 140 without deviating from the source of the invention.

Figure 16:
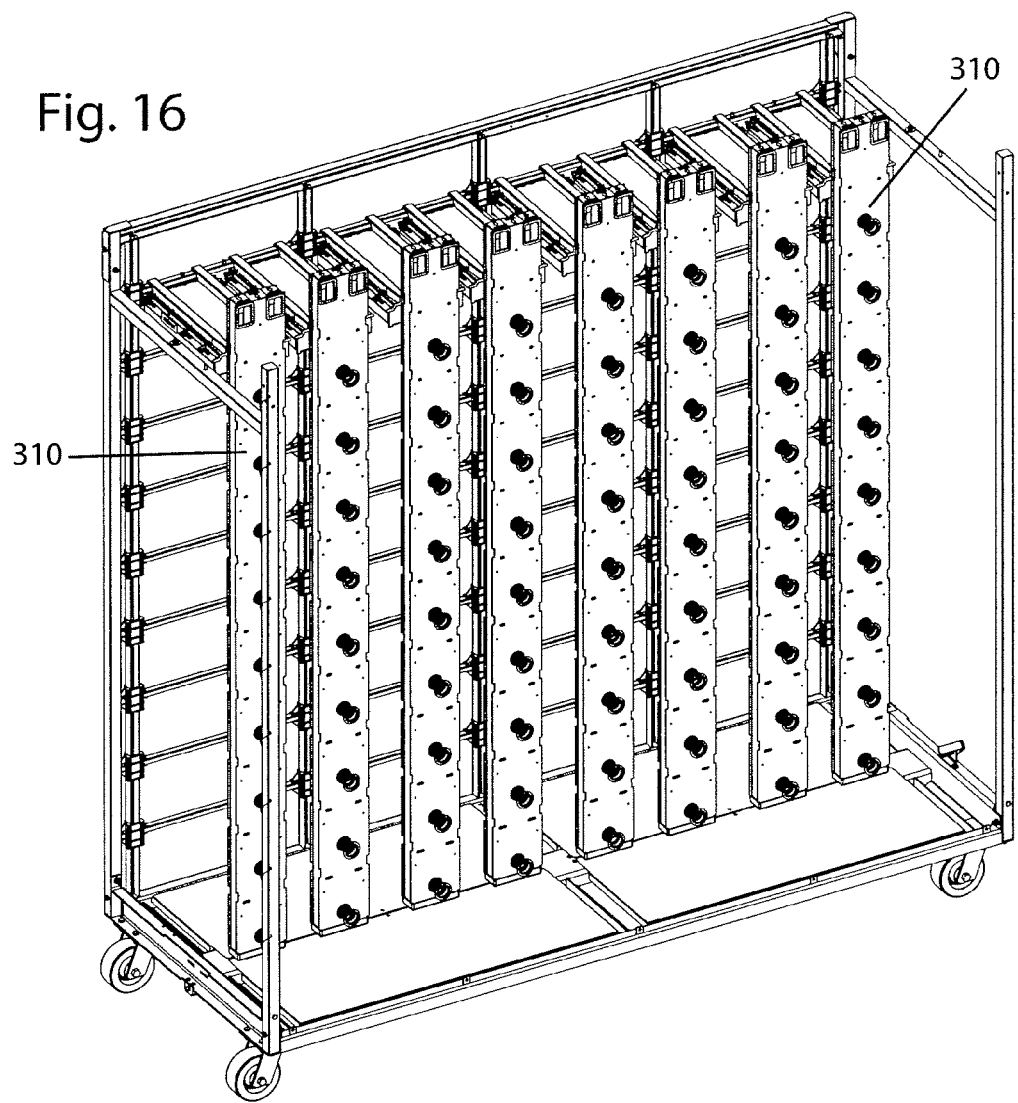
FIG. 16 is a perspective view of a partially assembled rack system in accordance with an embodiment of the invention.
Figure 17:
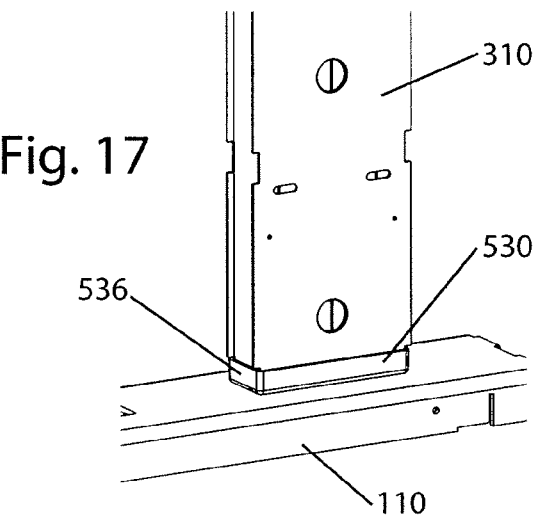
FIG. 17 is a partial perspective view of an air plenum and base of a rack system in accordance with an embodiment of the invention.
Figure 18:
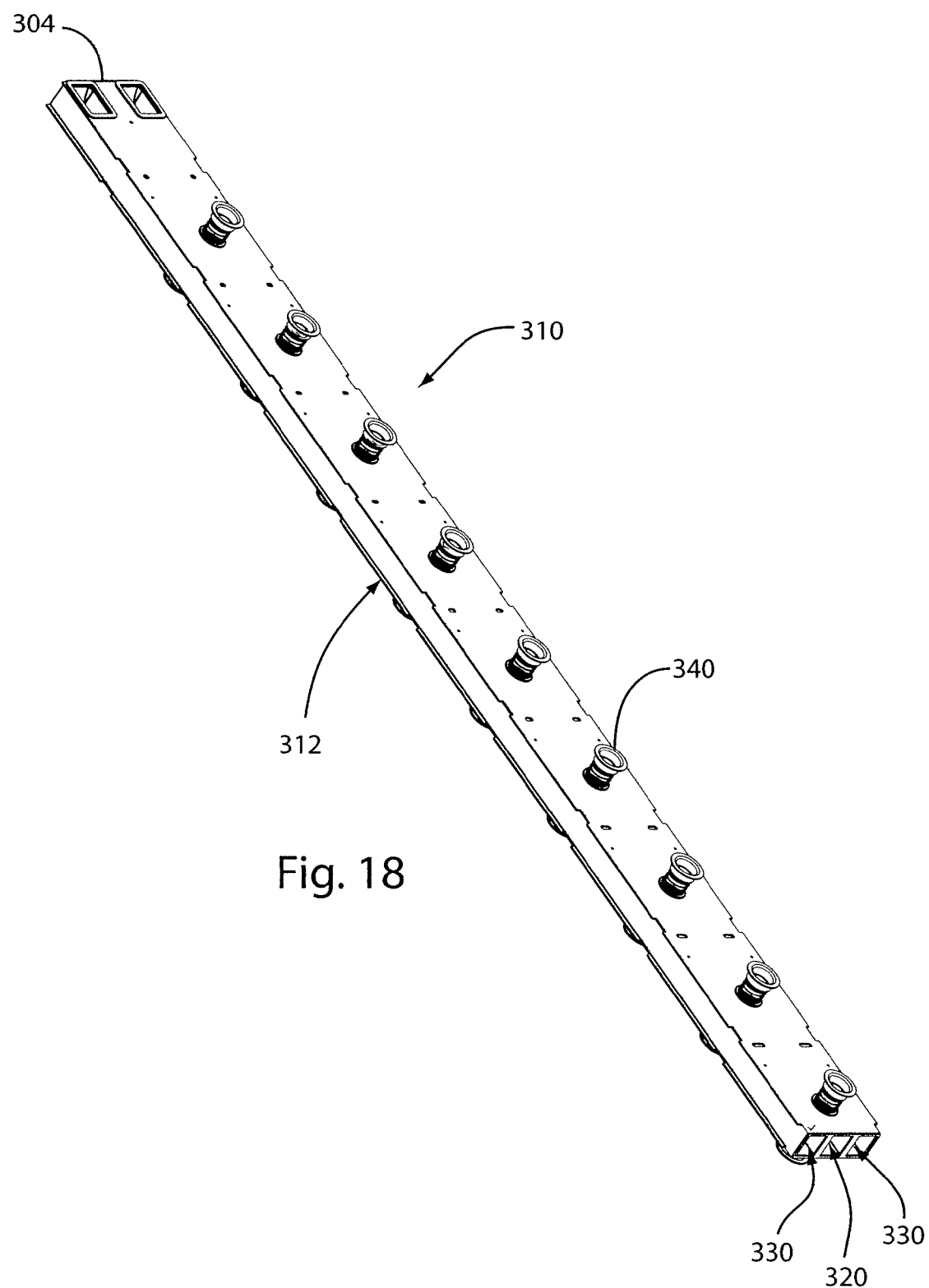
FIG. 18 is a perspective view of an air plenum in accordance with an embodiment of the invention.

When assembling ventilated rack system 10, canopy support flange 742 can be inserted into flange receiving member 312, for example, by tilting canopy 700 upward to insert a narrow end of canopy support flange 742 into flange receiving member 312. Canopy 700 can then be rotated down and away from vertical plenum 310 until canopy support tab 744 engages rear support beam 140 and preferably snaps in place. Preferably, a plurality of canopies 700 can be first installed on the top most rear support beam 140 as shown in FIGS. 16 and 21. Additional canopies 700 can be installed, for example, one for each rear support beam 140 and corresponding vertical plenum 310.

Figure 25:
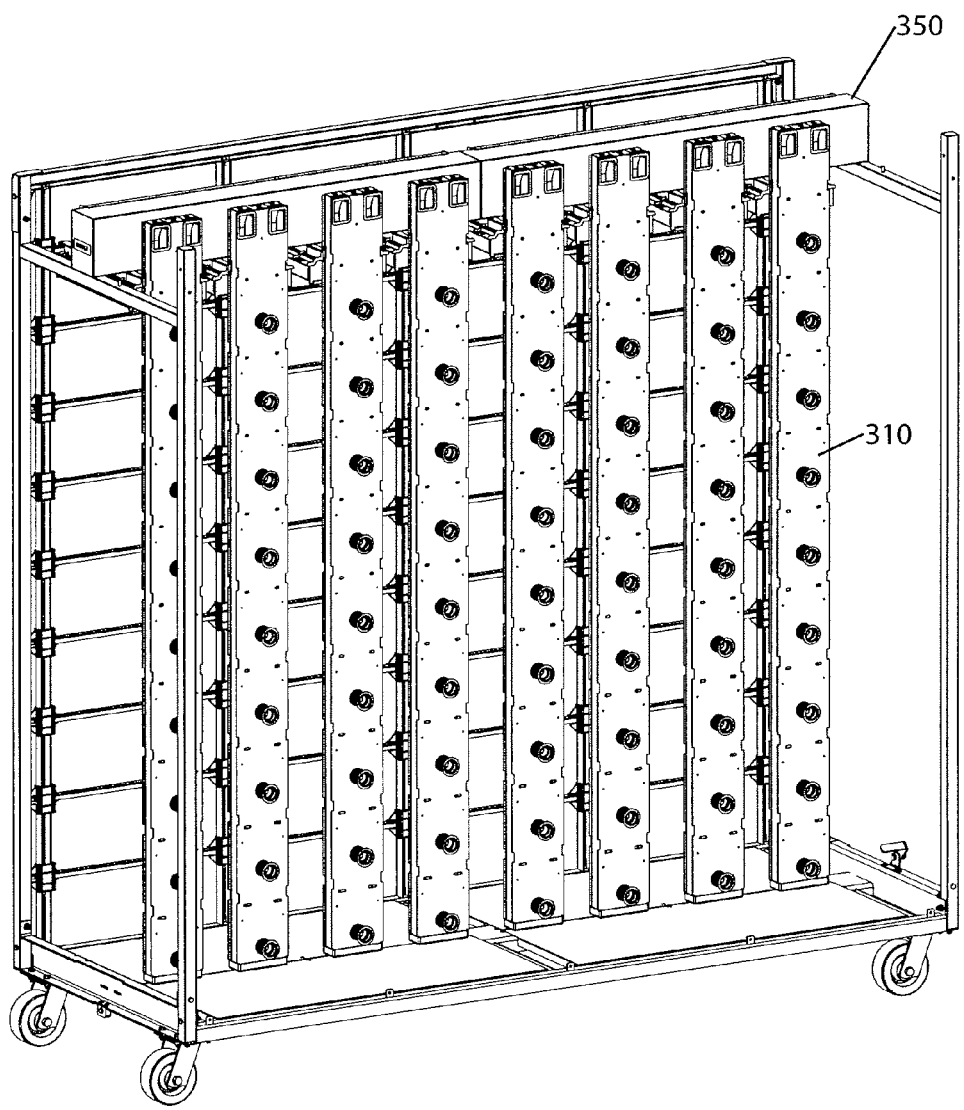
FIG. 25 is a perspective view of a partially assembled rack system in accordance with an embodiment of the invention.

Referring to FIG. 25, an air supply plenum 340 can be installed above the canopies 700 of the top rear support beam 140. Air supply plenum 340 preferably includes apertures (not shown) through which air can exit air supply plenum 340. Air supply plenum 340 and vertical plenum 310 are preferably arranged such that the apertures of air supply plenum 340 are aligned with air supply ports 322 of vertical plenum 310. Preferably, an airtight connection is provided between the apertures and air supply ports 322. By way of non-limiting example, a gasket can be provided between the apertures and the air supply ports 322, such that the gaskets are compressed when air supply plenum 340 is connected to vertical plenum 310, such compression providing to provide the air tight connection.

A front frame 230 having a plurality of front vertical beams 232, a front top beam 234 and a plurality of front support beams is preferably installed next, in a substantially similar manner as rear frame 130. A plurality of retainers assemblies 150 can be used to secure front support beams 240 to front vertical beams 232 and a plurality of canopies 700 are preferably installed along the top front support beams 240.

Figure 26:
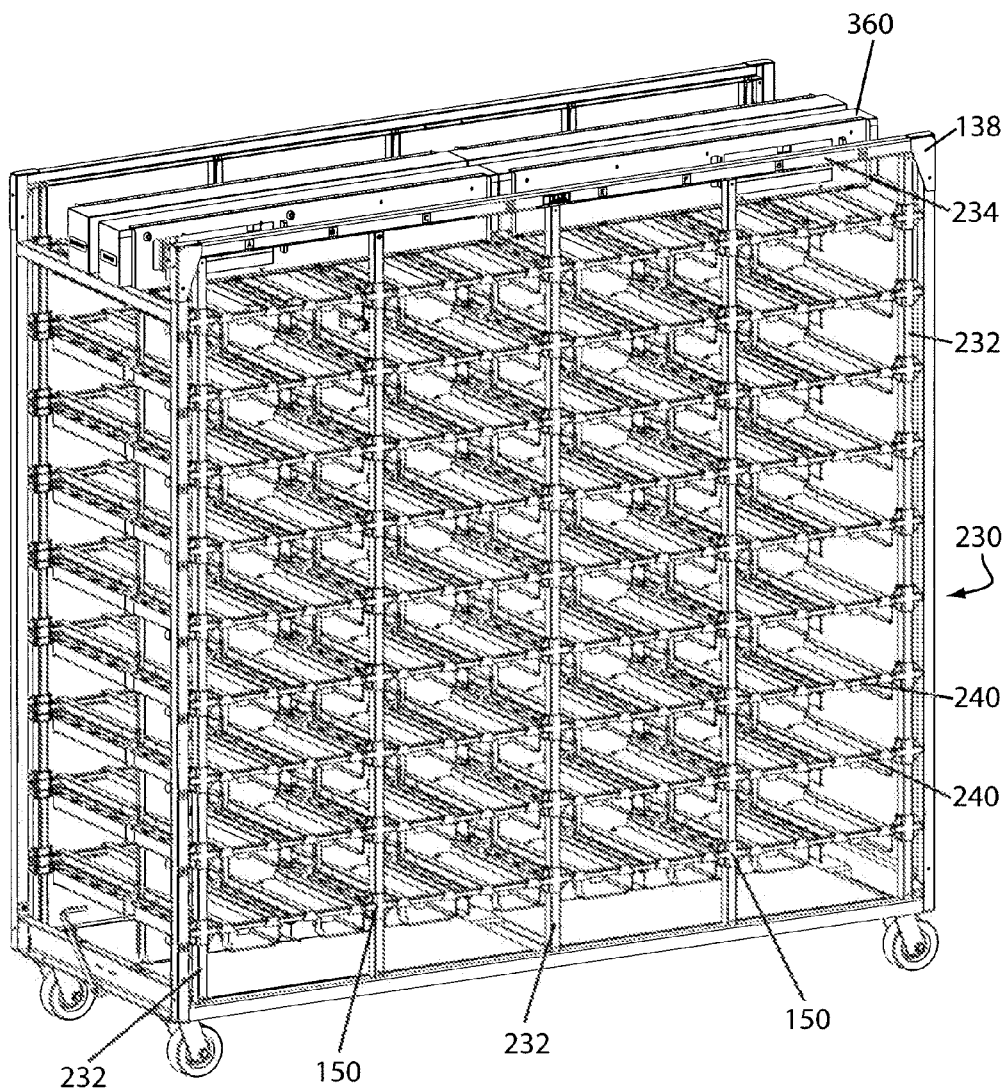
FIG. 26 is a perspective view of a rack system in accordance with an embodiment of the invention.

As shown in FIG. 26, an exhaust plenum 360 can thereafter be installed above the canopies 700 of the top front support beam 240. Exhaust plenum 360 preferably includes one or more apertures (not shown) preferably aligned with, more preferably having an airtight connection with, corresponding exhaust ports 332 of vertical plenum 310. By way of non-limiting example, a gasket can be provided between the apertures and the exhaust ports 332, such that the gaskets are compressed when exhaust plenum 360 is connected to vertical plenum 310, such compression providing to provide the air tight connection.

Referring to FIG. 26, both supply plenum 350 and exhaust plenum 360 can be supported at either or both ends by side support beam 124. Preferably, both supply plenum 350 and exhaust plenum 360 are secured to side support beam 124 to prevent inadvertent movement thereof.

Referring to FIGS. 27 and 32A-33B, one or more, preferably two each of air supply blowers 370 and exhaust blowers 380 can be connected to the respective supply plenum 350 or exhaust plenum 360. Air supply blower 370 preferably includes a suitable filter, such as a HEPA filter, and draws in ambient air from outside the ventilated rack system 10 and filters the air prior to supplying the air into supply plenum 250. Therefore, the air being supplied through the air supply channels 320 into each cage 20, 22 or rack 100 are filtered, preferably HEPA filtered.

Exhaust blower 380 can also include a filter, more preferably, a HEPA filter therein. Therefore, the air received from cages 20, 22 and rack 100 can be filtered before being expelled into the facility exhaust return or the room, facility or location at which ventilated rack system 10 is located. Preferably after blowers 370, 380 are installed, control system is installed.

Figure 27:
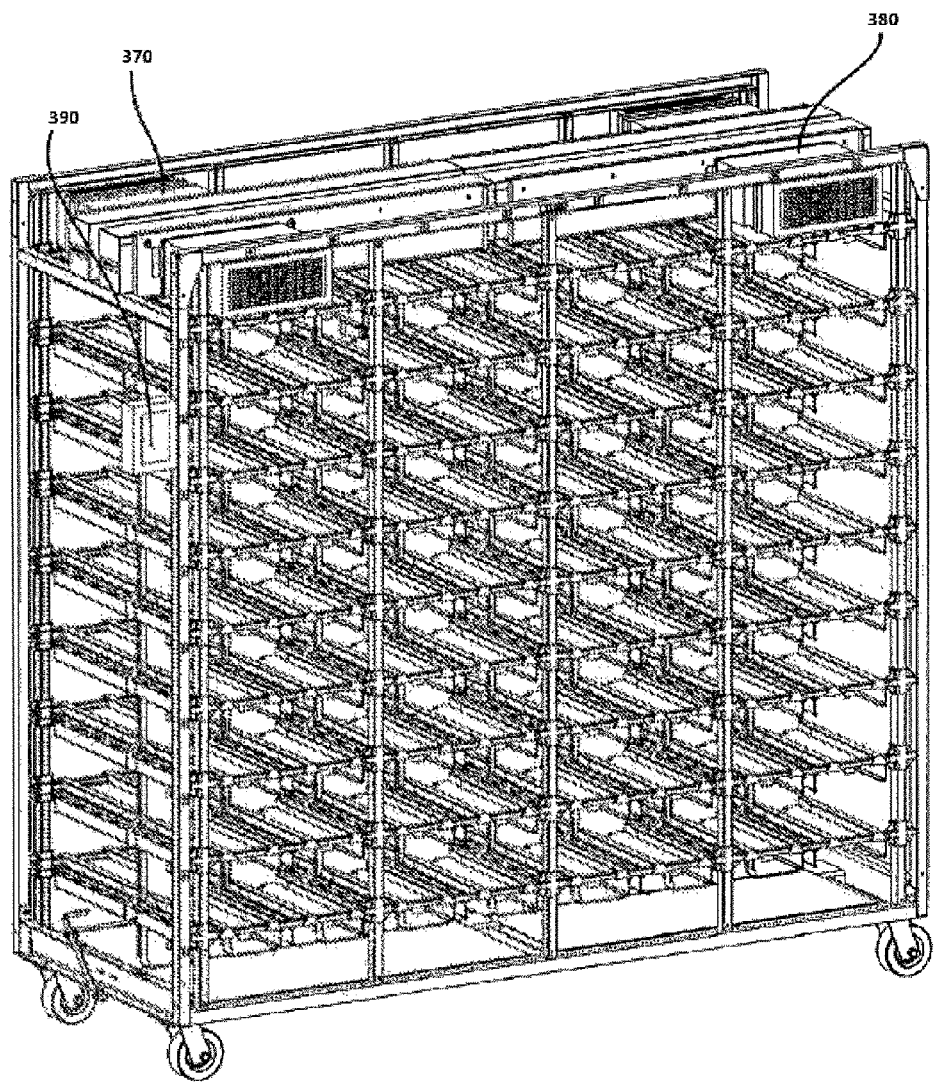
FIG. 27 is a perspective view of a rack system in accordance with an embodiment of the invention.

After both supply plenum 350 and exhaust plenum 360 are installed, or after control system is installed, the remaining canopies 700 are preferably installed, as illustrated in FIGS. 26-27. However, it is to be understood that the blowers 370, 380 and/or control system can be installed after installing the remaining canopies 700 without deviating from the scope of the invention.

Canopies with Removable Sides

Figure 34:
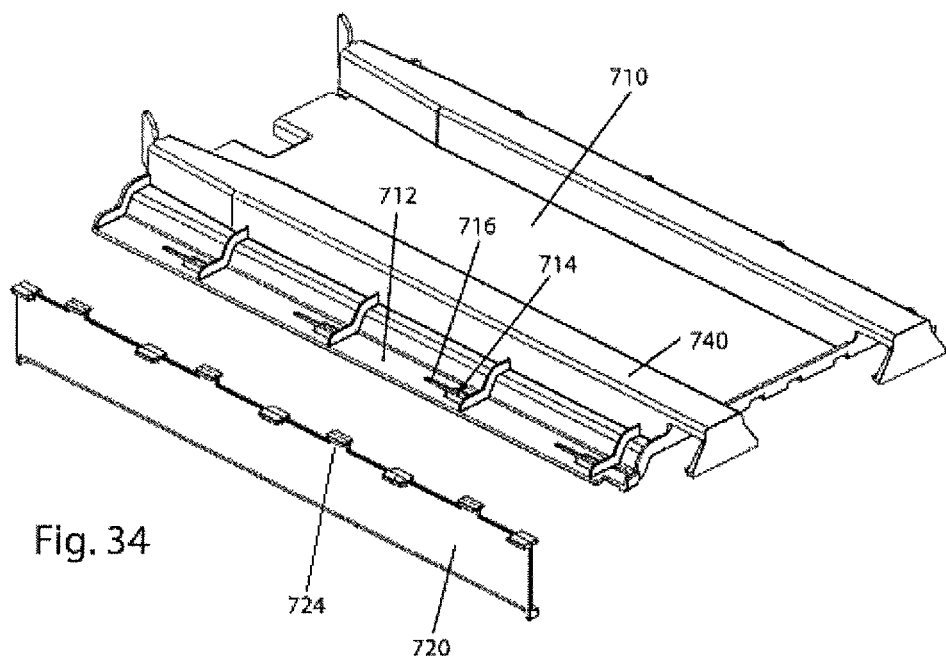
FIG. 34 is an exploded perspective view of a canopy in accordance with an embodiment of the invention.

Reference is made to FIGS. 22 and 34 wherein an exemplary embodiment of canopy 700 is illustrated. Canopy 700 can include a canopy top 700 having a canopy top flange 712, which includes a canopy top aperture 714 and slot 716. Canopy 700 can also include one or more canopy sides 720 having a canopy side flange 722 extending inward along the bottom surface of canopy side 720. Canopy 700 can further include a canopy rear 730 having a canopy rear flange 732 extending inward. Preferably, canopy rear flange 732 and canopy side flange 722 are aligned and contact cage 20, 22 housed under canopy 700.

Preferably, cage 20, 22 includes an outwardly extending lip which can facilitate capturing air from cage 20, 22 both through the filter top and air escaping between the cage top and cage bottom. Canopy side flange 722 preferably prevents the air from traveling past canopy side flange 722, thus facilitating the capture and withdrawal of the air. Preferably, canopy top 710 of canopy 700 beneath cage 20, 22 is constructed and arranged to support cage 20, 22 thereon. Alternatively, canopy side flange 722 can be constructed and arranged to suspended cage 20, 22 beneath canopy 700. It is to be understood that beams, shelving units, etc. can be provided to support cage 20, 22 beneath canopy 700 without deviating from the scope of the invention.

In accordance with an exemplary embodiment shown in FIG. 34, canopy side includes a canopy side tab 724 constructed and arranged to be inserted into canopy top aperture 714. Preferably, canopy side tab 724 extends perpendicularly from and is wider than the thickness of canopy side 720. Therefore, canopy side 720 can be relatively easily attached to canopy top 710 by inserting canopy side tab 724 upward through canopy top aperture 714 and sliding canopy side 720 such that canopy side tab 724 slides above slot 716. Likewise, removing canopy side 720 is also relatively easy, by applying upward pressure on front tab above side panel, thus facilitating canopy modification, repair, stackability when not in use, etc.

Figure 35:
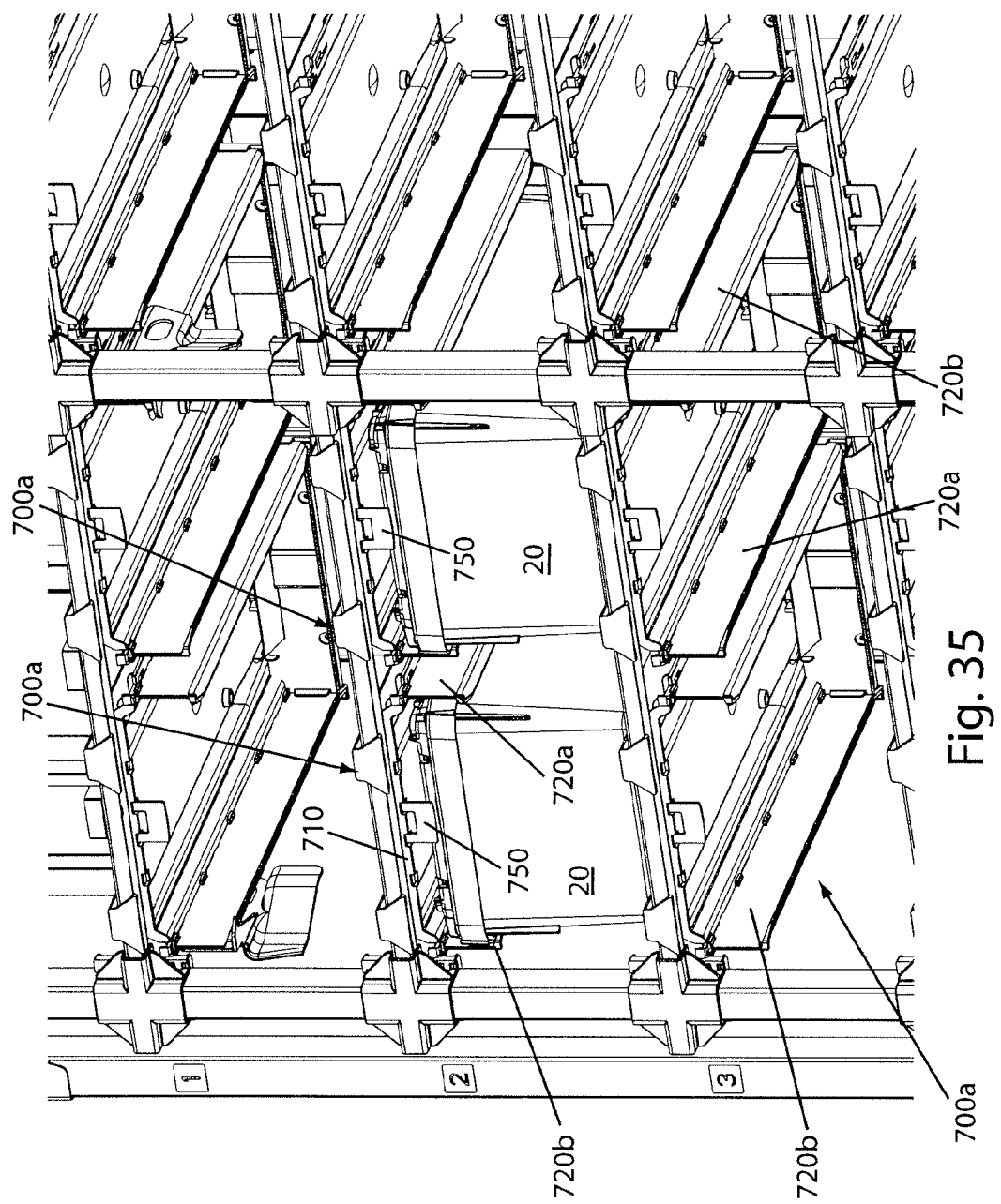
FIG. 35 is a partial perspective view of an embodiment of a canopy and a cage.
Figure 36:
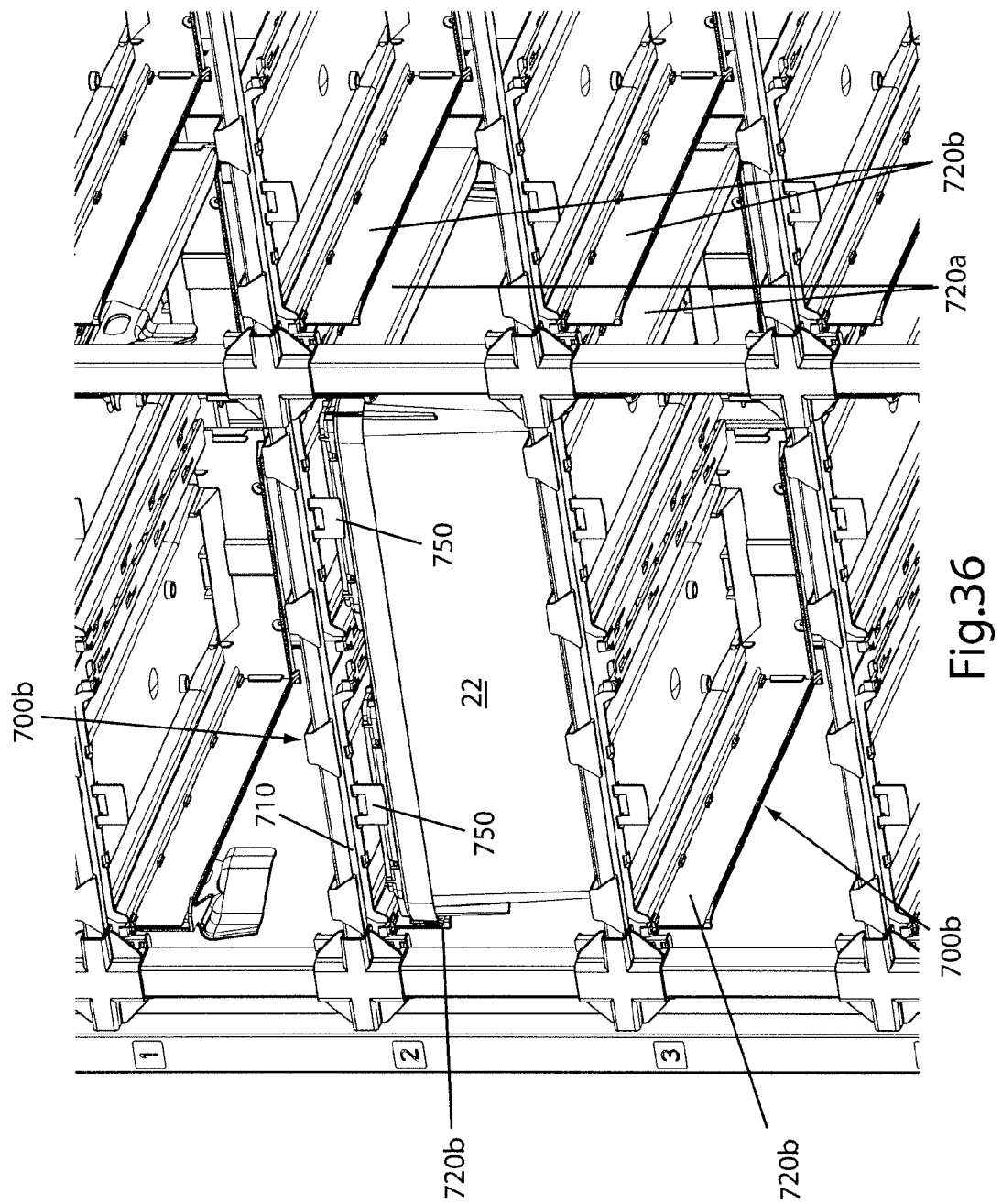
FIG. 36 is a partial perspective view of an embodiment of a canopy and a cage.

Reference is made to FIG. 35, wherein canopies 700a are illustrated having inner sides 720a and outer sides 720b, canopies 700a being suitable for housing a narrow cage 20 thereunder. As shown, canopies 700a each shrouds a narrow cage 20. In FIG. 36, adjacent canopies 700b are illustrated as each having inner canopy sides 720a removed and the outer canopy sides 720b attached to canopy tops 710, thus creating a larger area under which a wide cage 22 can be received. Preferably, wide cage 22 includes a cage top having two separate filter portions coinciding with canopy tops 710, and a solid portion between the filter portions. Therefore, the filters of the cage top can be maintained under canopy tops 710 to preferably prevent escape of air from within wide cage 22 into rack 100. Rather, air exiting wide cage 22 will enter the gap between wide cage 22 and canopy top 710, and can be drawn into exhaust channel 330. Preferably the negative air pressure provided by exhaust channel 330 is strong enough to withdraw substantially if not all of the air exiting wide cage 22 through the filters. Alternatively, the cage top of wide cage 22 can contact canopy tops 710 to substantially prevent the flow of air between canopy tops 710.

In accordance with an exemplary embodiment, canopy 700 includes a canopy opening 702 proximate the rear of canopy 700, through which air from the area above cage 20, 22 can be drawn into exhaust channel 330 through first exhaust apertures 336. Canopy opening 702 can be located between canopy top 710 and canopy rear 730, in either or both canopy top 710 and/or canopy rear 730 as a matter of application specific design choice. Preferably, canopy rear 730 further includes canopy rear apertures 734 aligned with second exhaust apertures 338 through which air surrounding the cage 20, 22 can be withdrawn into exhaust channel 330.

Referring to FIGS. 35-36, canopy 700 can include an indicator 750 constructed and arranged to indicate the proper connection between cage 20, 22 and air supply docking assembly 340. For example, the embodiment of indicator 750 illustrated includes a tab pivotally attached to canopy top 710, wherein indicator 750 extends downward when there is no pressure being applied thereon. The top of cage 20, 22 can contact and pivot indicator 750 inward as cage 20, 22 is being inserted below canopy 700. Preferably, once cage 20, 22 is sufficiently connected to air supply docking assembly 340, cage 20, 22 clears indicator 750, permitting indicator 750 to return to the downward extending position, thus indicating proper connection of cage 20, 22 to air supply docking assembly 340.

Whereas the example refers to single and double canopies, it is to be understood that canopies 700 can be adjusted in a variety of ways, according to the desired use. For example, if a cage has a width that is greater than wide cage 22, three or more canopies 700 can be combined by removing the necessary canopy sides 720 without deviating from the scope of the invention.

Clean-Out System

Reference is made to FIGS. 12-17 and 28-31B wherein an embodiment of a clean out system 500 is illustrated. In the embodiment shown, channels 320, 330 of vertical plenum 310 are in fluid communication with gasket apertures 532 of gasket top 530, gasket apertures 532 being sealed by a gasket bottom base 542 of a gasket bottom 542. For example, gasket bottom base 542 can abut gasket top 530 to create a seal therewith. In accordance with the embodiment shown in FIG. 17, gasket top 530 receives bottom end 302 of vertical plenum 310, preferably, via a slip fit, wherein bottom end 302 is inserted into gasket top 530.

Reference is made to the embodiment illustrated in FIGS. 12-13, wherein gasket top 530 includes a plenum receiving portion 536 extending above base 110, and a base insertion portion 538 extending through and beneath base 110. The plenum receiving portion 536 is constructed and arranged to receive the bottom end 302 of vertical plenum 310. Base insertion portion 538 is constructed and arranged for insertion into a corresponding aperture 114 (See FIG. 2) of base 110. Referring to the embodiments shown in FIGS. 13 and 30A-30B, base insertion portion 538 extends beneath base Gasket top 530 preferably includes a base insertion portion 538 having one or more gasket apertures 532, more preferably corresponding to the number and arrangement of channels 320, 330 of vertical plenum 310. Accordingly, if properly installed, channels 320, 330 of vertical plenum 310 are preferably aligned with the respective gasket aperture 532. Preferably, the inner walls of channels 320, 330 are flush with the inner walls of gasket apertures 532, thus providing a smooth flow of air, fluid, etc., that can be substantially hindrance free between channels 320, 330 and gasket apertures 532.

Gasket bottom 540 preferably also includes a plurality of gasket projections 544 constructed and arranged to be received in a plurality of gasket projection receiving apertures 534 of gasket top 530. Accordingly, when gasket bottom base 542 abuts gasket top 530, gasket projections 544 are completely received in gasket projection receiving apertures 534, thus facilitating maintaining gasket bottom 540 in place with respect to gasket top 530.

Channels 320, 330 can include ports 322, 332 proximate a top end 304 of vertical plenum 310. Preferably, each channel 320, 330 includes an opening 314 proximate top end 304. A cleaning fluid, such as water, can be introduced into channels 320, 330 via openings 314 or ports 322, 332. Preferably, ventilated rack system 10 will be positioned such that top end 304 is higher up than bottom end 302. Therefore, gravity can assist the flow of cleaning fluid from opening 314 or port 322, 332 toward bottom end 302. The fluid is preferably stopped by gasket bottom base 542. Therefore, if desired, channel 320, 330 can be completely filled with the cleaning fluid, thus ensuring that the cleaning fluid contacts the entire inner walls of channels 320, 330. Exhaust and air supply caps 324, 334 preferably internally deflect the cleaning liquid down into channels 320, 330.

The cleaning fluid is preferably drained from channel 320, 330 by displacing gasket bottom 540 away from gasket top 530. In accordance with the embodiment shown, a lever can be used to displace the gasket bottom 540, wherein the lever is easily accessible, for example, proximate the side of ventilated rack system 10. In accordance with previous systems commonly used, a user reached under the rack to open the gaskets individually to drain each plenum. Such a method could be cumbersome and time consuming. An embodiment of clean out system 500, in contrast, permits more than one, preferably all of the vertical plenums 300 to be drained simultaneously with relative ease without the need to reach under the rack.

Figure 31A:
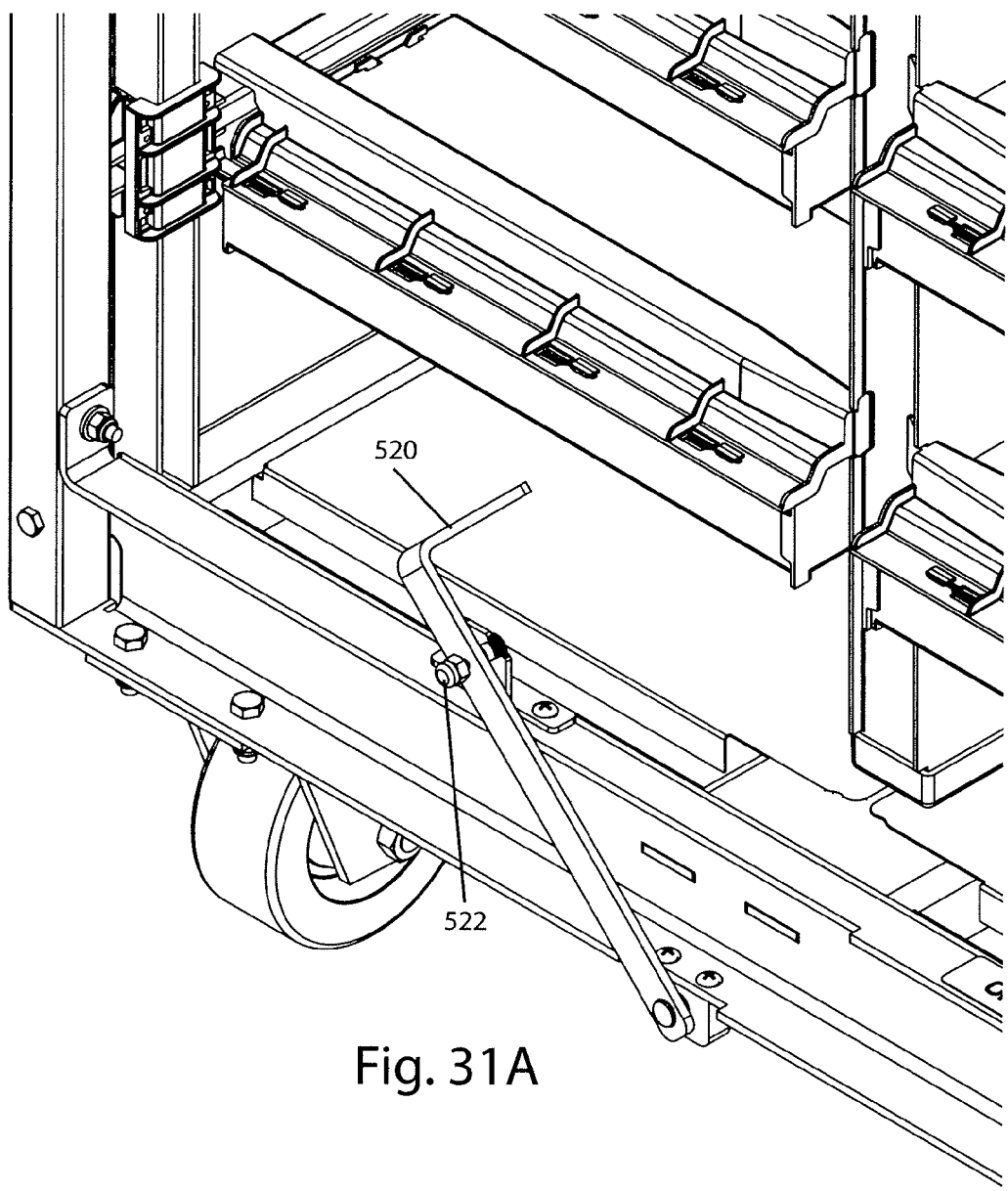
FIG. 31A is a perspective view of a clean-out gate lever in a first position in accordance with an embodiment of the invention.
Figure 31B:
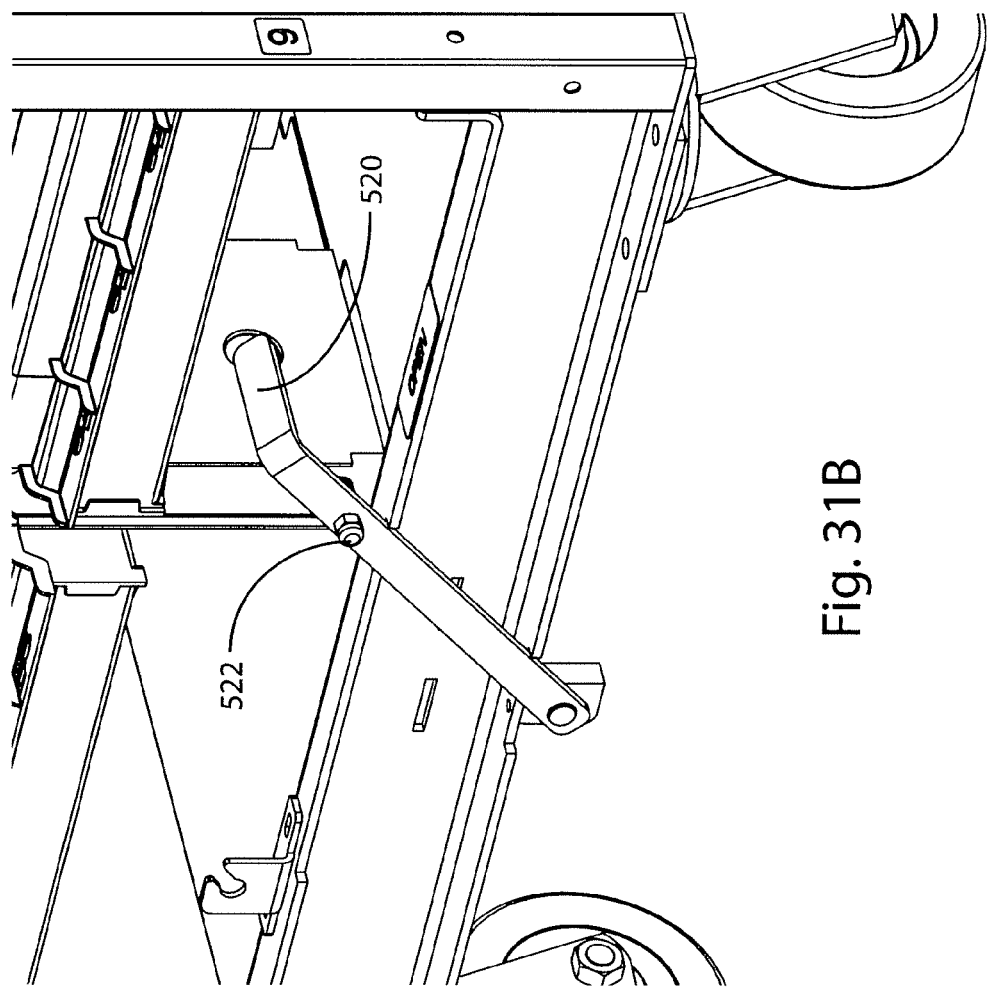
FIG. 31B is a perspective view of a clean-out gate lever in a second position in accordance with an embodiment of the invention.
Figure 32A:
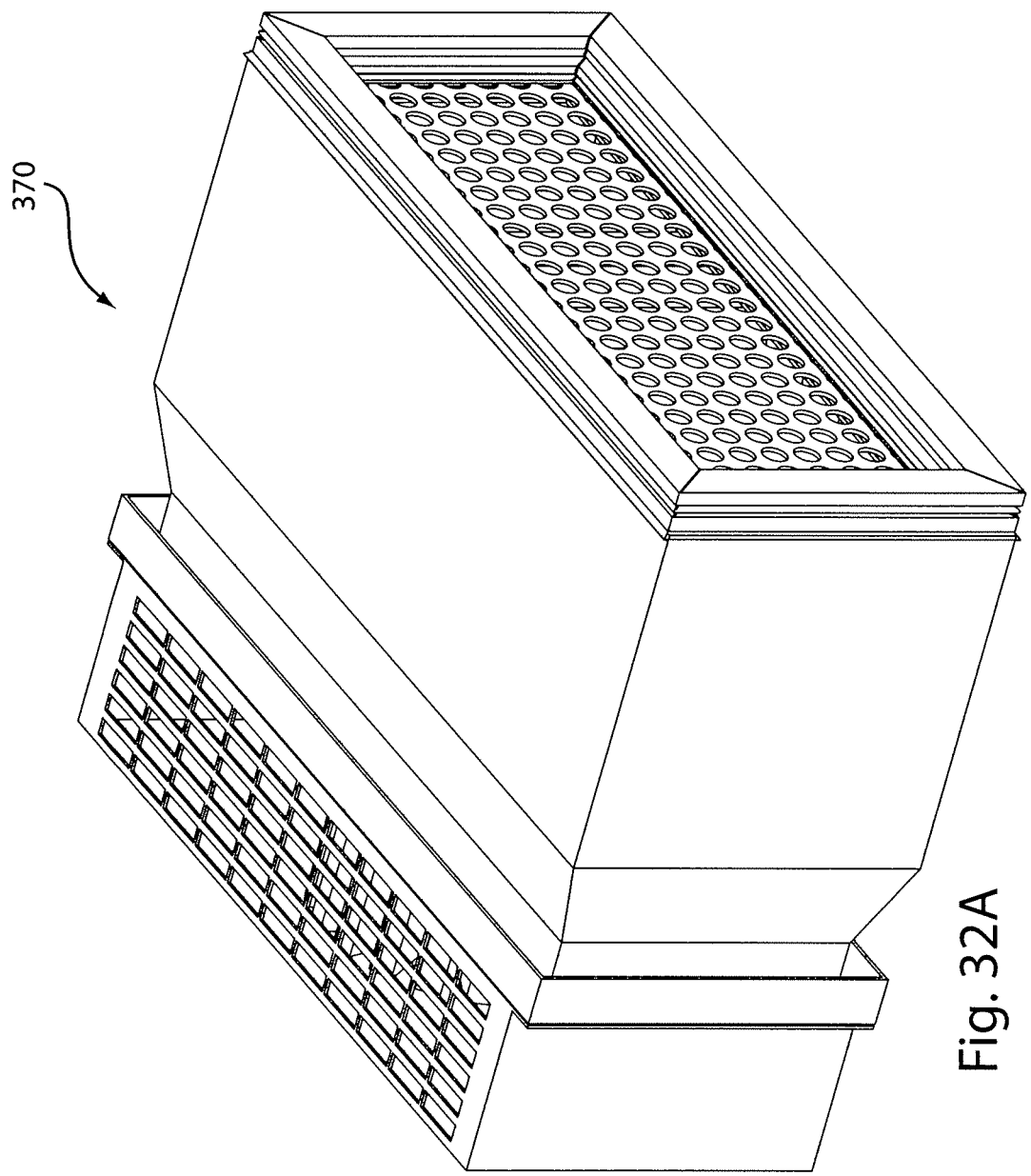
FIG. 32A is a perspective view of an air supply blower in accordance with an embodiment of the invention.
Figure 32B:
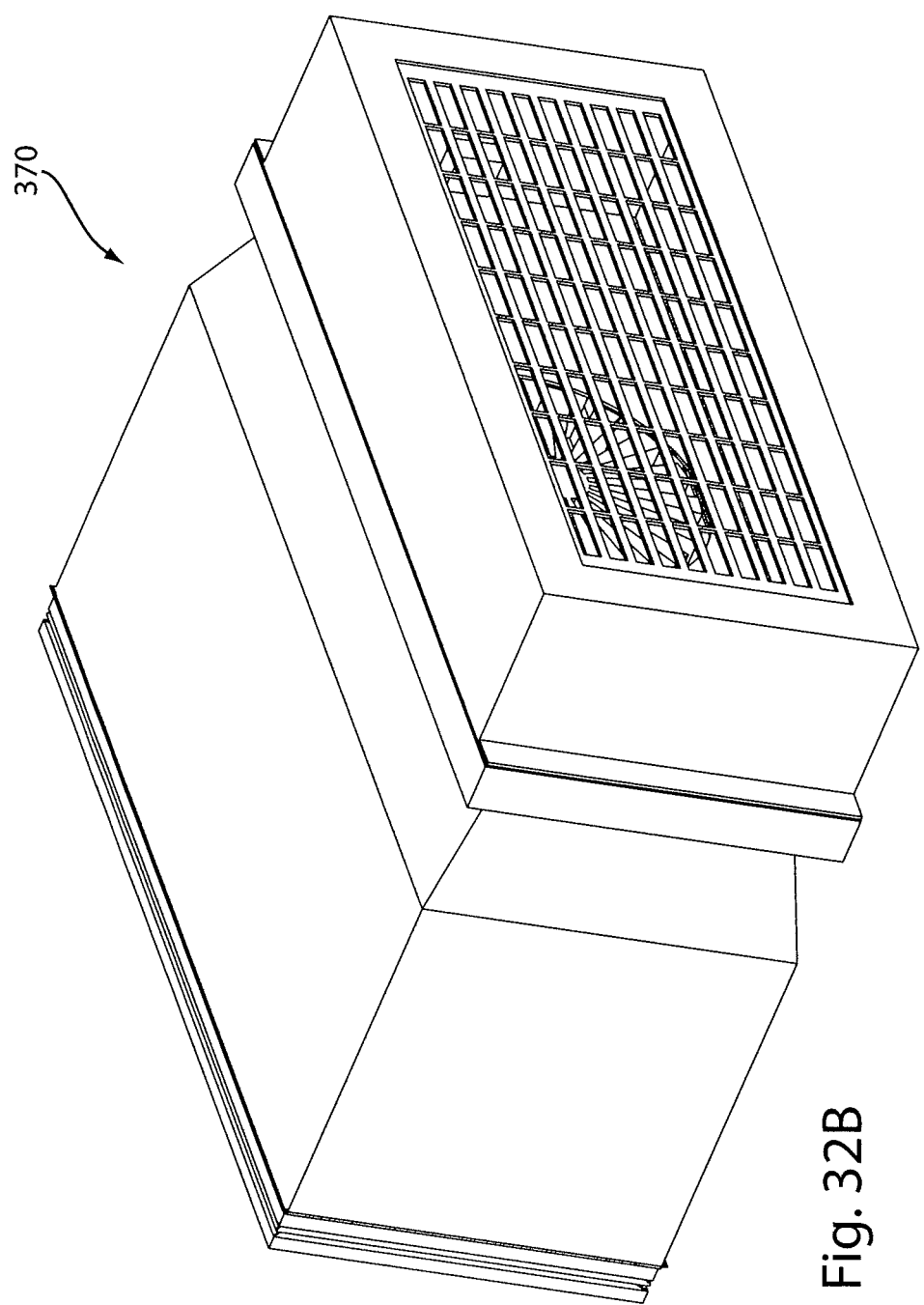
FIG. 32B is another perspective view of the air supply blower of FIG. 32A.
Figure 33A:
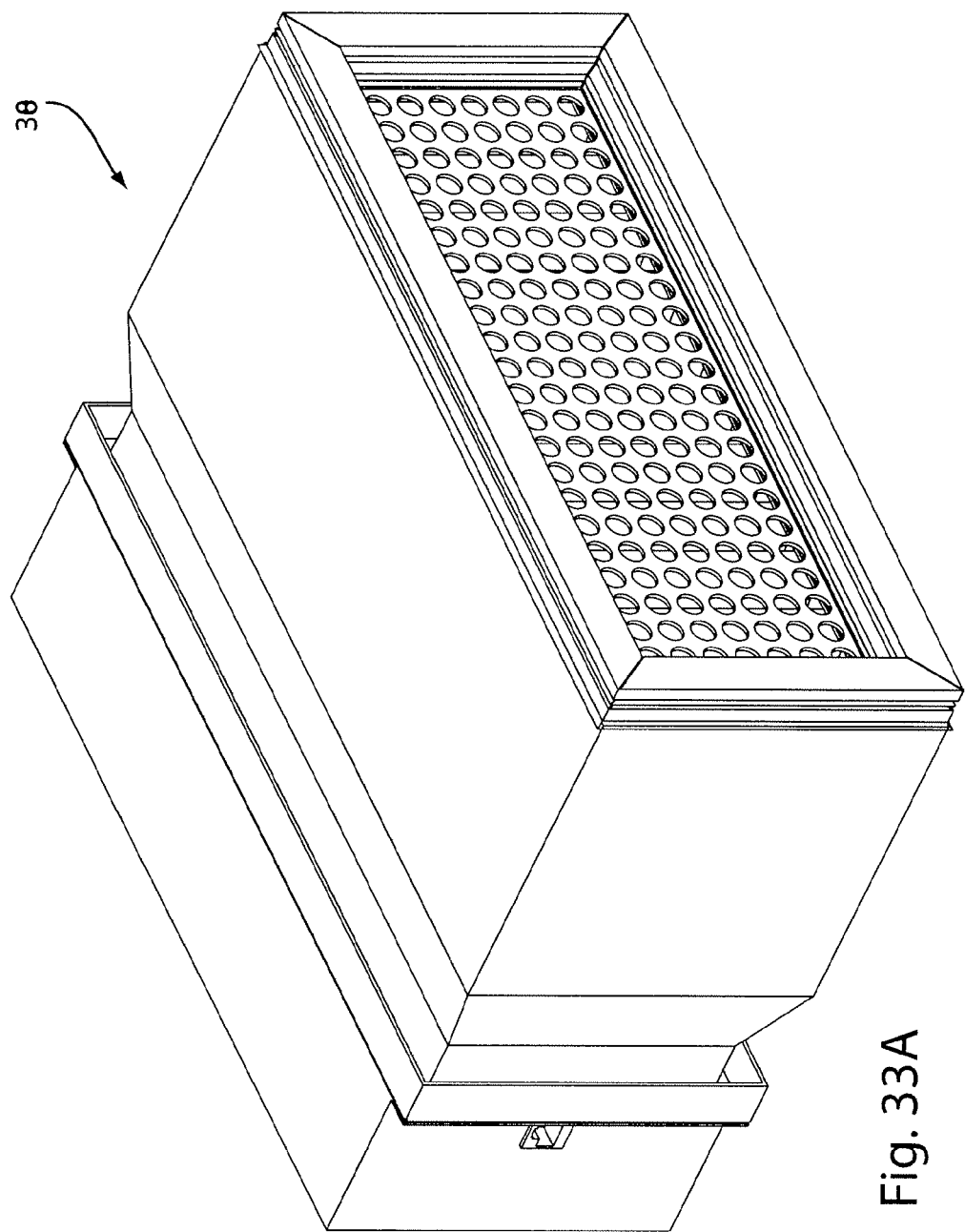
FIG. 33A is a perspective view of an exhaust blower in accordance with an embodiment of the invention.
Figure 33B:
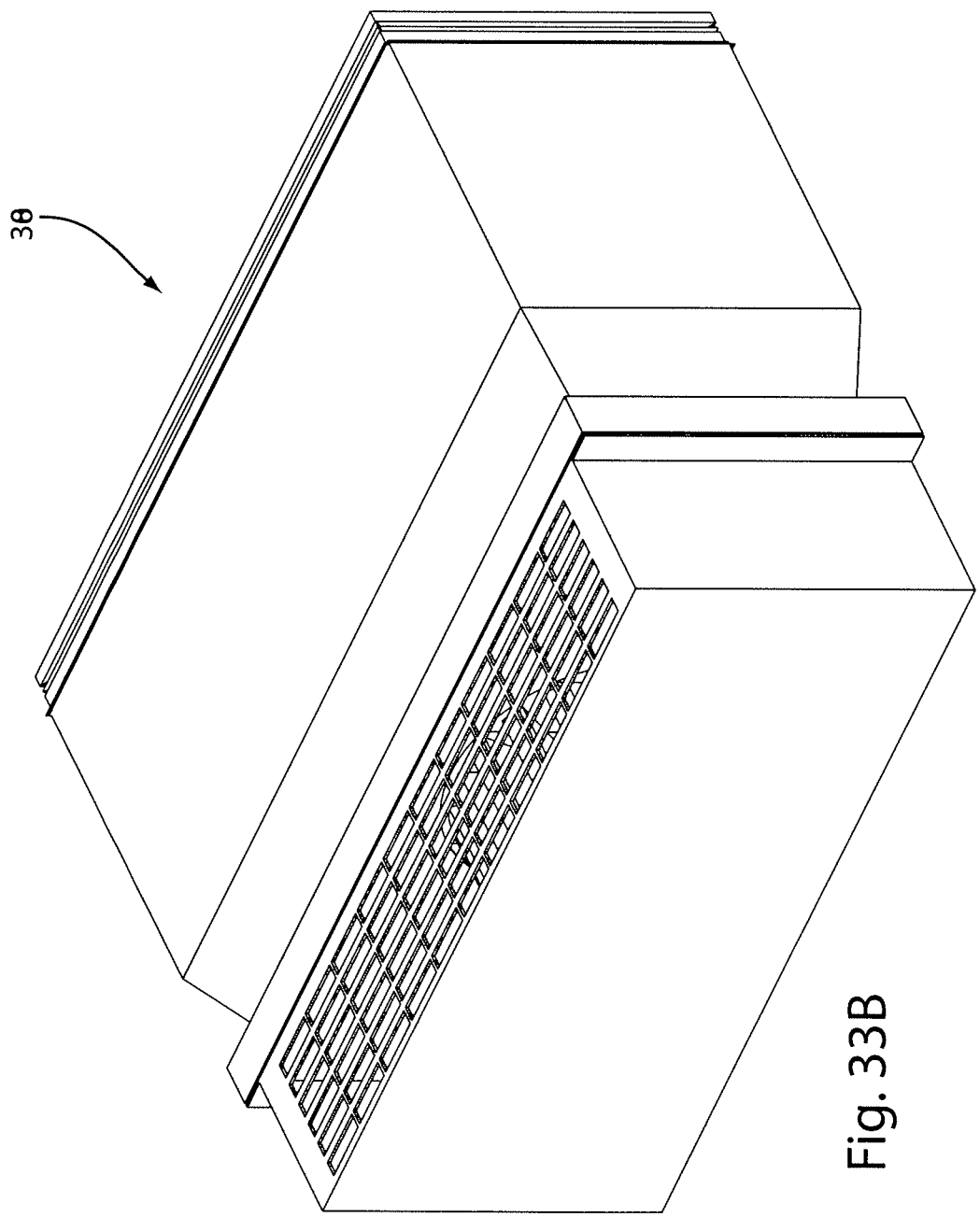
FIG. 33B is another perspective view of the exhaust blower of FIG. 33A.

Referring to FIG. 30A, gasket bottom 540 is maintained abutted to gasket top 530 via a stopper 512 of rod 510. Preferably, gasket bottom 540 includes a stopper receiving channel 546 constructed and arranged to receive stopper 512. In the embodiment shown in FIG. 28, rod 510 and stoppers 512 are elongated and substantially cylindrical. Preferably, when lever 520 is in the closed position as shown in FIG. 31A, rod 510 is positioned such that stopper 512 abuts gasket bottom 540 at stopper receiving channel 546. When lever 520 is displaced into the open position as shown in FIG. 31B, rod 510 is rotated such that stopper 520 is no longer received by stopper receiving channel 546 as shown in FIG. 30B. Rather, rod 510 itself can support gasket bottom 540 thereon. It is to be understood, however, that various alternatives are contemplated without deviating from the scope of the invention. For example, stopper 520 can be attached to gasket bottom 540 such that gasket bottom 540 rotates around rod 510. Alternatively, rather than rotating, rod 510 can be displaced downward to displace gasket bottom 540 from gasket top 530. In such an embodiment, stopper 520 may be eliminated and rod 520 can be received in stopper receiving channel. It is also to be understood that rod 520 can have a variety of shapes and is not limited to a cylindrical rod.

As shown in FIG. 30B, a gap is present between gasket top 530 and gasket bottom 540, thus permitting the flow of air, fluid, etc. into and out of gasket apertures 532. Accordingly, after filling vertical plenum 310 with the cleaning fluid, it can be drained relatively easily by moving lever 520. Alternatively, the lever can be kept in the open position to permit the cleaning fluid to flow continuously through channels 320, 330. Additionally, it may be preferable to maintain lever 520 in the open position while autoclaving, drying, etc.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the position of the various plenums, valves, and apertures as well as the arrangements thereof, can be changed without deviating from the scope of the invention as a matter of application specific to design choice. Additionally, other alterations can be made, as a way of non-limiting example, the number of shelves, compartments on the rack, or the number of cages that can be housed in each compartment, etc. as a matter of application specific to design choice, without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between.

What is claimed is:

1. A canopy system comprising:
    a plurality of canopies, each canopy having
        at least one selectively removable side wall, each selectively removable side wall including at least one side tab;
        a canopy top having at least one aperture constructed and arranged to receive the at least one side tab therethrough, the at least one aperture having a first portion and a second portion;
        wherein the at least one side tab is selectively insertable through the first portion of the at least one aperture in a first direction and movable across the second portion of the at least one aperture in a second direction to removably attach at least one removable side to the canopy top;
    wherein each canopy is constructed and arranged to shroud a first cage having a first width beneath the canopy and to maintain a gap between the canopy and the first cage to facilitate air flow,
    wherein two adjacent canopies include inner side walls and outer side walls, such that the two adjacent canopies having the inner side walls removed can shroud a second cage having a second width greater than the first width.

2. A canopy constructed and arranged to shroud a cage beneath the canopy and maintain a gap between the canopy and the cage to facilitate air flow, the canopy comprising:
    a canopy top having a canopy top flange, wherein the canopy top flange defines at least one canopy top aperture; and
    a selectively removable side configured to readily accommodate cages of different sizes, the selectively removable side having:
        at least one canopy side interlocking tab designed and configured to be selectively insertable through the at least one canopy top aperture in a first direction and selectively slidable in a second direction perpendicular to the first direction to interlock the selectively removable side with the canopy top; and
        at least one canopy side abutting tab designed and configured to abut the canopy top flange when the selectively removable side is interlocked with the canopy top.

3. The canopy of claim 2 wherein the canopy top aperture includes an insertion portion and a slot portion, wherein the insertion portion is dimensioned to receive the at least one canopy side interlocking tab and the at least one canopy side interlocking tab is slidable above the slot portion to removably interlock the selectively removable side to the canopy top.

4. The canopy of claim 2 wherein the at least one canopy side interlocking tab extends substantially perpendicular from the selectively removable side.

5. The canopy of claim 2 wherein the selectively removable side includes a thickness and the at least one canopy side interlocking tab is wider than the thickness of the selectively removable side.

6. The canopy of claim 2, further comprising a second selectively removable side, wherein the selectively removable side is selectively removable independent of the second selectively removable side.

7. The canopy of claim 2 further comprising an aperture through which air above the cage can flow.

8. The canopy of claim 2 further comprising a flange extending inward from the removable sides, the flange being constructed and arranged to contact a lip of the cage.

9. The canopy of claim 2 further comprising a rear wall having a flange for supporting a cage beneath the canopy.

10. The canopy of claim 2 wherein the canopy is constructed and arranged to support a cage above the canopy.

* * * * *